(12) United States Patent
Stacey et al.

(10) Patent No.: US 6,590,909 B1
(45) Date of Patent: Jul. 8, 2003

(54) ATM COMMUNICATIONS SYSTEM AND METHOD

(75) Inventors: David John Stacey, Stanstead Abbotts (GB); Simon Daniel Brueckheimer, London (GB); Keith Caves, Sawbridgeworth (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/341,004

(22) PCT Filed: Jan. 21, 1998

(86) PCT No.: PCT/GB98/00179

§ 371 (c)(1),
(2), (4) Date: Sep. 3, 1999

(87) PCT Pub. No.: WO98/33355

PCT Pub. Date: Jul. 30, 1998

(30) Foreign Application Priority Data

Jan. 22, 1997 (GB) ............................................. 9701270

(51) Int. Cl.[7] .............................. H04J 3/02; H04J 3/04
(52) U.S. Cl. ...................................... 370/537; 370/536
(58) Field of Search ................................ 370/336, 337, 370/340, 343, 345, 347, 349, 473, 466, 469, 479, 493, 498, 536, 537, 538, 542

(56) References Cited

U.S. PATENT DOCUMENTS 4,763,321 A * 8/1988 Calvignac et al. ........... 370/236
5,774,469 A * 6/1998 Wirkestrand ................. 370/473
5,802,050 A * 9/1998 Petersen et al. ............. 370/394
5,802,051 A * 9/1998 Petersen et al. .......... 370/395.42
5,809,023 A * 9/1998 Petersen et al. ............. 370/336

FOREIGN PATENT DOCUMENTS

WO  WO 95/34977  12/1995
WO  WO 96/34478  10/1996

OTHER PUBLICATIONS

Johnson, "Support for Low Bitrate Applications in ATM Networks", Proceedings of IFIP 4th Workshop Performance Modelling, 1996, pp. 39/1–39/14.

* cited by examiner

Primary Examiner—Wellington Chin
Assistant Examiner—William Schultz
(74) Attorney, Agent, or Firm—Lee, Mann, Smith, McWilliams, Sweeney & Ohlson

(57) ABSTRACT

There is disclosed a method and a system for multiplexing data from a plurality of user data sources across an ATM adaption layer type-2 connection, in which a multiplexed trunk group extends across a plurality of common part sub-layer protocol data unit (CSU-PDU) mini-cells, and across a plurality of ATM cells. Large trunk groups are assembled by use of a single bit continuation indicator in the service specific convergence sub-layer header (SSCS) of successive CPS-PDU mini-cells. A packet payload type field (PPT) of the common part sub-layer (CPS)/service specific convergence sub-layer (SSCS) is used to indicate timing of changes in number of user data sources in a trunk group and provides for robust error recovery on loss of a single CPS-PDU mini-cell.

8 Claims, 19 Drawing Sheets

ATM Minicell

CID = Channel identifier (8 bits)
LI = Length indicator (6 bits)
PPT = CPS - Packet payload type (2 bits)
UUI = CPS - User to user indication (3 bits)
HEC = Header error control (5 bits)
DATA = User data (1 to 45 or 64 octets)

ATM Minicell

OSF = Offset field           (6 bits)

SN = Sequence number         (1 bit)

P = Parity                   (1 bit)

Decoder

Packet lost before change implemented

Packet lost with change indicator

Packet lost after the change

ATM COMMUNICATIONS SYSTEM AND METHOD

FIELD OF THE INVENTION

The invention relates to digital communications networks, and particularly, although not exclusively to an arrangement and method for transmitting multiplexed multi-user asynchronous transfer mode (ATM) traffic across such communications networks.

BACKGROUND TO THE INVENTION

The known asynchronous transfer mode (ATM) transmission technique is a modem telecommunications switching technique which is able to switch connections for a wide range of different data types at a wide range of different bit rates. ATM technology provides a flexible form of transmission which allows various types of service traffic data, e.g. voice data, video data, or computer generated data to be multiplexed together onto a common physical means of transmission. Currently, several trends are encouraging the widespread introduction of ATM; for example the availability of high speed, low error rate communication links between switching centers, an availability of technology to digitize video and speech, and pressure to reduce operating costs by integrating previously separate telephony and data networks. ATM technology allows speech data, video data and inter-computer data to be carried across a single communications network. The information carried in each of these services is reduced to digitized strings of numbers which are transmitted across such a communications network from point to point.

A method of switching synchronous transfer mode cells in a circuit emulated ATM switch using a layered protocol model is described in specification No. WO-95-34977. A method of transferring ATM microcells in a telecommunications system is described in specification No. WO-96-34478.

Referring to FIG. 1 herein, there is shown schematically a portion of a communications network comprising first and second node devices 100, 101 respectively linked by a communications link 100. Transport of ATM data communications traffic is made across the communications link 102 between the first and second node devices, which may be for example switches 101, 102. Digitized data is received from customer equipment such as telephones, computers, faxes, modems and video broadcast apparatus in the form of frames of digitized signals at transmitting node, e.g. switch 100. The frames can either be of variable length or fixed length, and may arrive at the switch at a variable rate; or at a fixed rate. The frames of data arriving at the switch are packaged into ATM data cells 103, which have a fixed number of bytes. Transport of ATM cells between node devices is handled by the node devices operating in accordance with the ATM protocol corresponding to the International Standards Organization (ISO) Open Systems Interconnexion (OSI) architecture, layers two and three[1]. Packaging of the incoming data frames received asynchronously from the customer equipment is handled by the switches operating in accordance with ATM adaptation layer (AAL) protocols which segment the arriving frames of data into payload data of the ATM cells at the transmission node, and reassemble the payload data into frames at the destination node 102. The ATM adaptation layer corresponds to layer four of the OSI model. Equipment operating in accordance with the ATM adaptation layer protocols are capable of structuring incoming data in different ways, to suit different service types, e.g. video data, computer generated data, voice data. Many different service types can be implemented by the ATM adaptation layer simultaneously.

The basic reason for having ATM cells is that they have a fixed length. Fixed length cells are easier for hardware to handle than variable length frames. The ATM adaptation layer packages various types of data of variable length or fixed length frame type into the fixed length ATM cells for transport between physical devices. Because the ATM cell length was historically selected to accommodate various types of traffic, fixing the length of the ATM cell involved difficult decisions, and the final length of ATM cell selected is not perfect for each type of data carried. The ATM cell comprises a header portion which carries routing information and other housekeeping information necessary for the operation of the ATM network, and a payload portion which carries the actual data traffic. To transfer delay sensitive services such as speech, it is important that the ATM cell be reasonably short in order to avoid unacceptably long delays in filling the cell payload portion before transmitting the cell across the network. On the other hand, for other types of traffic such as computer to computer file transfers longer cells are more efficient, since the proportion of available transmission bandwidth taken up by the ATM cell header compared to the data payload of the cell is reduced. For delay insensitive traffic, the overhead of the housekeeping information sent in the header of each ATM cell would be relatively large if short cells were to be used. Thus, the choice of ATM cell size is a compromise and is settled at a length of 53 octets, comprising 48 octets of data payload (the ATM Service Data Unit, ATM-SDU) and a 5 octet header for transmission of housekeeping protocol information, as shown schematically in FIG. 2 herein. The protocol header in the ATM cell constitutes approximately 10% of the whole cell. This size of ATM cell introduces a delay in transmission of data which is significant for types of data having a low data rate, for example speech data. For example for a conventional 64 kilobits per second (kbit/s/s) voice data traffic, normal speech data samples are converted into one octet of digital data every 125 microseconds ($\mu$s). Thus, 48×125 $\mu$s=6000 $\mu$s are required to fill the 48 data octets of an ATM cell payload. This introduces a 6 millisecond (ms) delay to each cell transmitted, in addition to two network switching delays one from each switch, and transmission delays across the network. For speech services, it is important to have an effectively constant delay between source and destination of a call, and the delay must be reasonably short. Large variations in delay produce broken sound effects, and make voice signals unintelligible to a service user. Long delays, for example those sometimes encountered on transatlantic satellite links, make two-way conversation awkward. In general, a conventionally accepted maximum one-way delay for speech data is 25 ms. Delays longer than this, as well as making the speech service unacceptable to users, also require complicated and expensive echo suppression equipment, which has the additional disadvantage of introducing noise. Thus, the conventional 53 octet ATM cell is not ideal for 64 kbit/s voice data traffic. However, with the advent of mobile telecommunications systems, normal 64 kbit/s sampled voice signals are compressed using code compression algorithms, resulting in transmission data rates as low as 4 kbit/s. Under these circumstances, the delay introduced in filling a full ATM cell may be as high as 96 ms, an unacceptably high delay.

In view of the above delays and to accommodate different data traffic types, the ATM adaptation layer (AAL) is split into a number of sub-layers. A first sub-layer, the known AAL-type 1 layer is aimed at constant bit rate services. The currently developing, and not yet finalized AAL-type 2 layer (formerly known in Europe as AAL-type 6, and elsewhere as AAL-CU) allows multiple variable length sub-cells, called mini-cells to be carried within one ATM cell. An object of AAL-type 2 is to support all services which require the multiplexing of information from multiple user data sources into a single ATM connection. The AAL-type 2 protocol, which breaks the basic rule of ATM that all cells be of fixed length, is aimed at being expedient for carrying low speed data where the delay caused by waiting for a full ATM cell to fill is too long, and the overhead of carrying an incomplete ATM cell is too great. However, the implementation of this layer is incomplete and there still remains a requirement for a method of transmitting data from a multiplicity of sources, including low bit rate data, over ATM networks in an efficient manner.

SUMMARY OF THE INVENTION

One object of the present invention is to provide an improved method for transmitting delay sensitive data from a plurality of user data sources over a communications network.

Another object of the present invention is to provide a method of transmitting multi-service data from a range of different data sources over an ATM network in an efficient manner.

Another object of the present invention is to provide a robust method of transmitting large trunk groups of data of a plurality of data user sources, over a communications network.

According to one aspect of the present invention there is provided a method of transmitting data in a communications network, said method comprising the steps of:

receiving a plurality of data samples comprising at least one said data sample received from each of a plurality of user data sources;

multiplexing said plurality of data samples into a data payload of at least one asynchronous transfer mode mini-cell;

packetizing said mini-cell(s) into at least one asynchronous transfer mode cell; and transmitting said asynchronous transfer mode cell(s).

Preferably each said mini-cell carries data from a plurality of user data sources.

According to a second aspect of the present invention there is provided a method of communicating user data of a plurality of user data sources over a communications network, said method comprising the steps of:

multiplexing a respective data sample from each of a plurality of user data sources to produce a frame of user data, said frame containing data of each of said plurality of user data sources; and assembling said frame into a plurality of data payloads of a corresponding plurality of asynchronous transfer mode mini-cells.

Said frame may be of a length greater than a payload of a single said mini-cell.

A said frame may be partitioned to run consecutively across a plurality of said data packet payloads.

Preferably said method comprises the step of:

assembling a respective protocol header to each of said mini-cells, said protocol header comprising a continuation indicator signal indicating whether or not said frame continues beyond a length of said mini-cell.

Preferably said continuation indicator signal comprises a single bit field.

Preferably a said mini-cell comprises an asynchronous transfer mode adaptation layer-type 2-common part sub-layer packet.

Preferably said continuation indicator signal comprises an asynchronous transfer mode adaptation layer-type 2 header.

Preferably said continuation indicator signal comprises an asynchronous transfer mode adaptation layer-type 2 service specific convergence sub-layer field.

According to a third aspect of the present invention there is provided a method of communicating user data of a plurality of user data sources over a communications network, said method comprising the steps of:

signaling an asynchronous transfer mode adaptation layer type-2 connection;

multiplexing user data of said plurality of user data sources into a trunk group frame;

assembling said trunk group frame into a payload of at least one asynchronous transfer mode variable length cell;

transmitting said asynchronous transfer mode cell(s) across said network.

According to a fourth aspect of the present invention there is provided a method of communicating user data of a plurality of user data sources over a communications network, said method comprising the steps of:

multiplexing a data sample from each of a plurality of user data sources to produce a frame of user data, said frame containing data of each of said plurality of user data sources; and assembling said frame into a data payload of at least one asynchronous transfer mode mini-cell.

Preferably said method comprises the step of:

including a protocol header signal in a said mini-cell, to indicate a change in number of user data sources who's data is assembled into a said at least one mini-cell.

Preferably said method comprises the step of using a packet payload type field of a service specific convergence sub-layer header of an asynchronous transfer mode mini-cell to indicate change of number of said user data sources who's data is carried in a series of said mini-cells.

Preferably said method comprises the step of using a packet payload type field of an asynchronous transfer mode mini-cell header to signal timing of a change of a number of said multiplexed users.

Preferably said mini-cell comprises an ATM adaptation layer type-2 mini-cell.

According to a sixth aspect of the present invention there is provided a method of communicating user data to a plurality of user data sources of a communications network, said method comprising the steps of;

multiplexing data of a first plurality of user data sources into a first data group having a first group size;

assembling said first data group into a data payload of a first set of at least one mini-cell;

multiplexing data of a second plurality of user data sources into a second data group having a second group size;

assembling said second data group into a data payload of a second set of at least one mini-cells, wherein each said mini-cell comprises a respective protocol header, said protocol header arranged to indicate a change in group size between successive mini-cells.

According to a seventh aspect of the present invention there is provided a method of transmitting data in a communications network, comprising the steps of:

receiving a plurality of data samples comprising at least one said data sample received from each of a plurality of user data sources;

multiplexing said plurality of data sources into a trunk group;

establishing a trunk group connection using an asynchronous transfer mode adaptation layer-type 2 negotiation procedure;

signaling additions or subtractions of users in the trunk group by incorporation of signals contained within an asynchronous transfer mode adaptation layer-type 2 protocol header, whilst leaving said asynchronous transfer mode adaptation layer-type 2 trunk group connection intact.

According to an eighth aspect of the present invention there is provided a method of communicating user data of a plurality of user data sources across a communications network comprising a plurality of transmitting entities and receiving entities, said method comprising the steps of:

signaling to a said receiving entity to create a trunk group connection;

multiplexing data of said plurality of user data sources into a trunk group data frame;

signaling to said receiving entity a length of said trunk group data frame;

assembling said trunk group data frame into a plurality of asynchronous transfer mode adaptation layer type-2 mini-cells; and signaling a change in length of said trunk group data frame in an asynchronous transfer mode adaptation layer type-2 mini-cell header.

Preferably said step of signaling a length of said trunk group data frame comprises signaling by an asynchronous transfer mode negotiation procedure protocol.

Preferably said step of signaling a change in length of said trunk group data frame comprises signaling within an asynchronous transfer mode adaptation layer type-2 payload packet type field.

According to a ninth aspect of the present invention there is provided a method of implementing changes in data payload of an asynchronous transfer mode adaptation layer type-2 mini-cell by decoding a payload packet type field of said mini-cell in accordance with the following steps:

decoding a received packet payload type signal 10 as indicating a mini-cell contains a new data payload containing data from a different number of user data sources compared with a previously received mini-cell.

Preferably said method comprises the step of decoding a received packet payload type field signals as follows:

decoding a first mini-cell having packet payload type field 00 followed by an immediately succeeding second mini-cell including packet payload type signal 00 as indicating no change in a number of user data sources in a data payload of said mini-cells.

Preferably said method comprises the step of decoding a received packet payload type field signals as follows:

decoding a first mini-cell having packet payload type field 01 followed by an immediately succeeding second mini-cell including packet payload type signal 01 as indicating no change in a number of user data sources in a data pay load of said mini-cells.

Preferably said method comprises the steps of:

in an asynchronous transfer mode adaptation layer-type 2 connection, decoding a received packet payload type signal 00 of a first mini-cell and a received packet payload type signal 01 of a next received mini-cell as indicating a loss of data.

Preferably said method comprises the steps of:

in an asynchronous transfer mode adaptation layer-type 2 connection, decoding a received packet payload type signal 01 of a first mini-cell and a packet payload type signal 00 of next received mini-cell as indicating a loss of data.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

Figure 1:
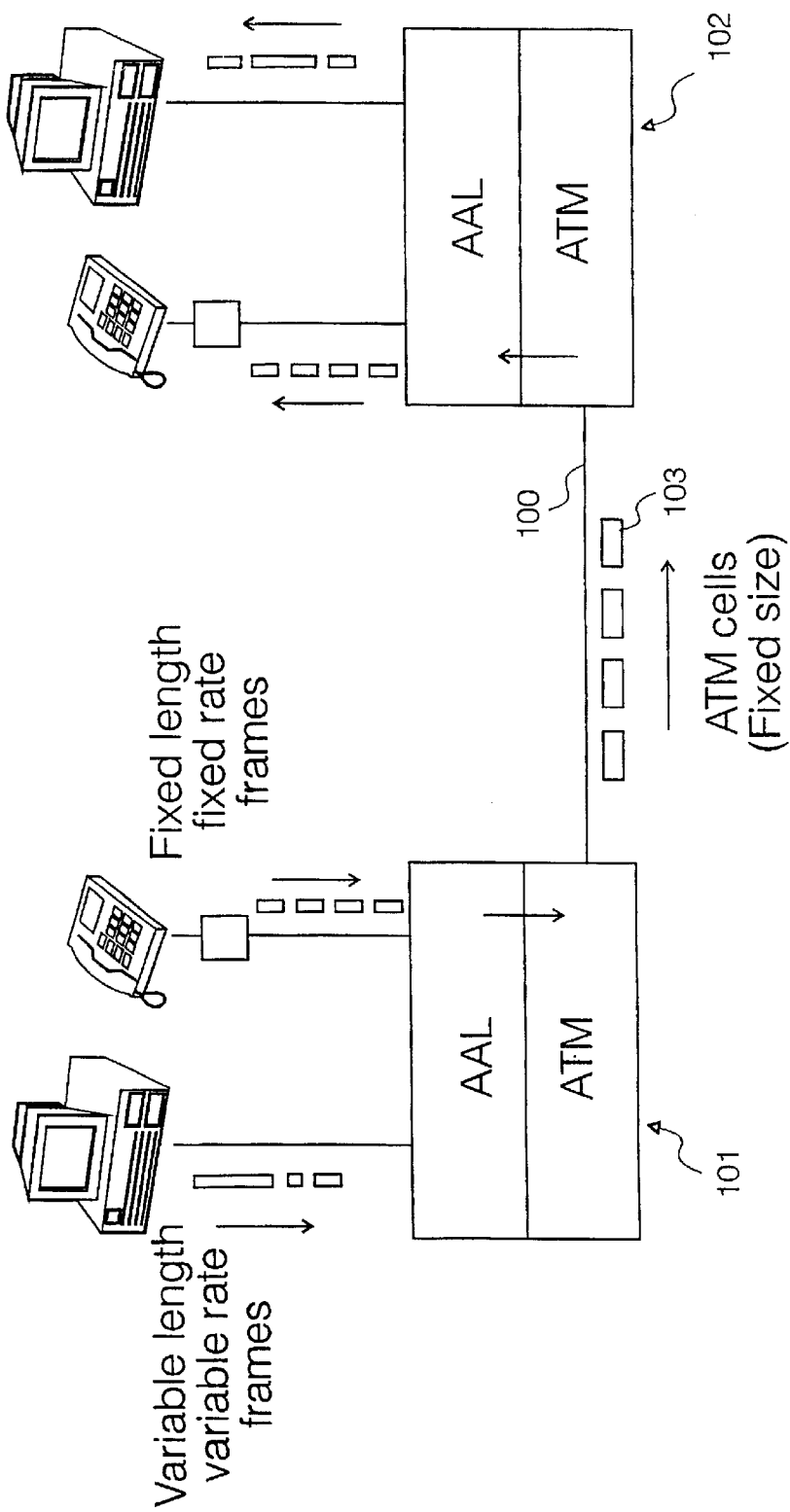
FIG. 1 shows schematically a portion of a communications network comprising first and second node devices.
Figure 2:
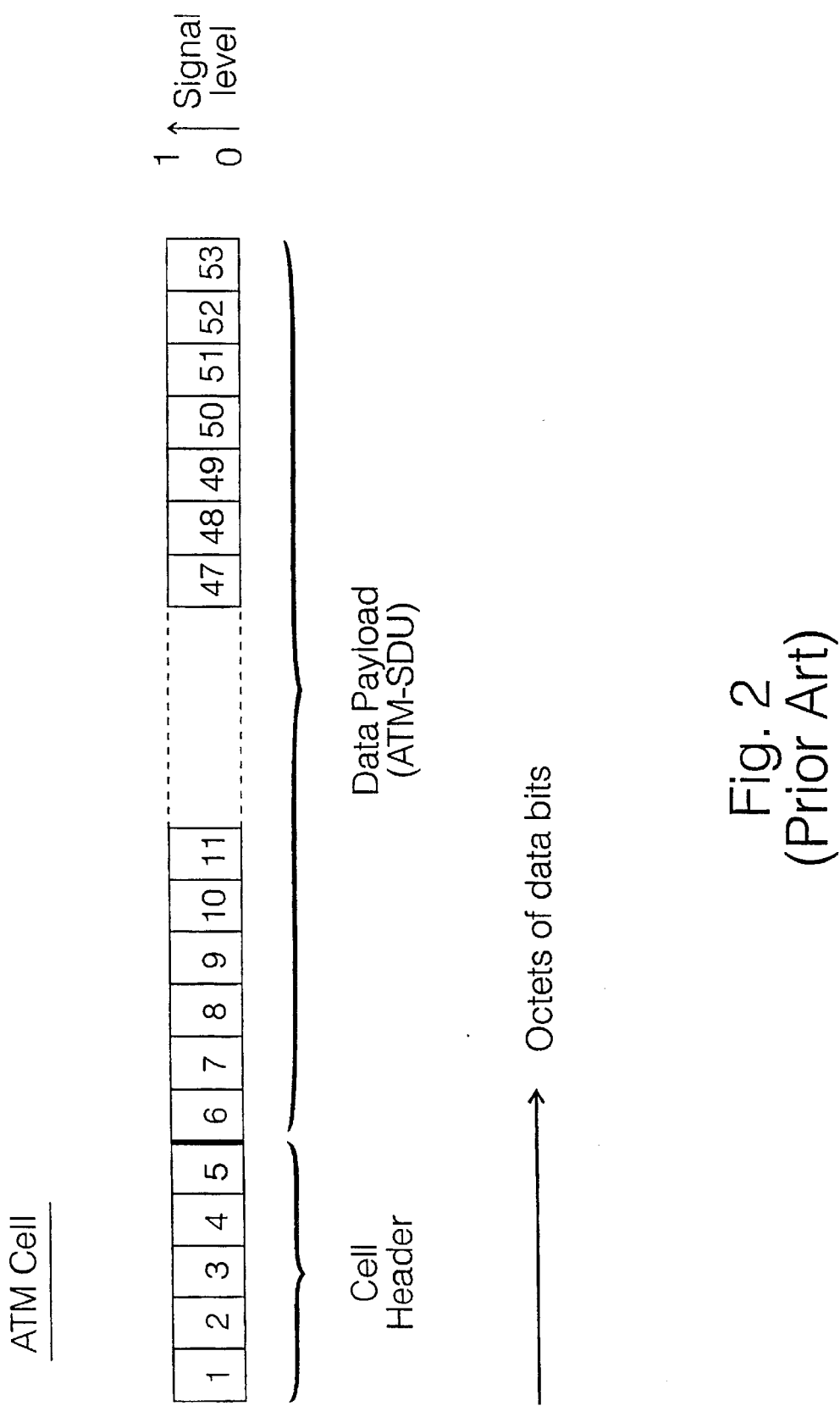
FIG. 2 shows schematically the ATM cell size comprising a length of 53 octets.
Figure 3:
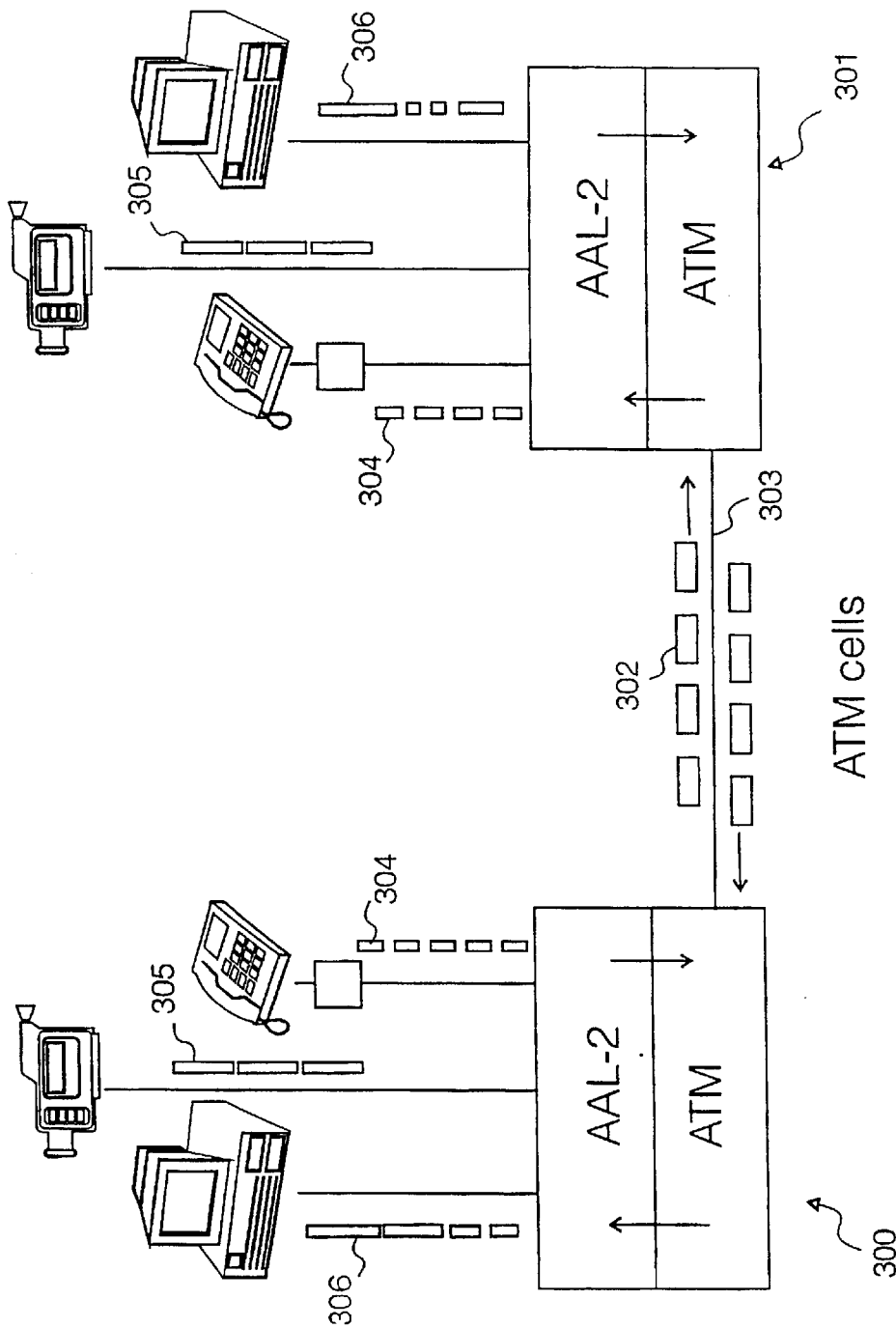
FIG. 3 illustrates conceptually a communications network hardware comprising first and second node devices connected by a communications link device, the node devices acting as receiving and transmitting entities for transmission of communications data.

Referring to FIG. 3 herein, there are shown first and second ATM node device, 300, 301 respectively between which are transmitted data signals in the form of ATM cells 302 which are transmitted across a physical transmission medium 303 between the node devices single user or multi-service data from a plurality of single service or multi-service data sources, for example speech data 304, video data 305, and computer generated data 306 are input into the node devices 300, 301 and incorporated into the plurality of ATM cells 302. FIG. 3 illustrates a simple form of physical network comprising two node devices and one link device, in order to illustrate principles of the best mode for carrying out the invention without unnecessarily obscuring the invention. It will be appreciated by the skilled reader that methods and processes according to the invention will be applicable to highly complex communications networks.

Figure 4:
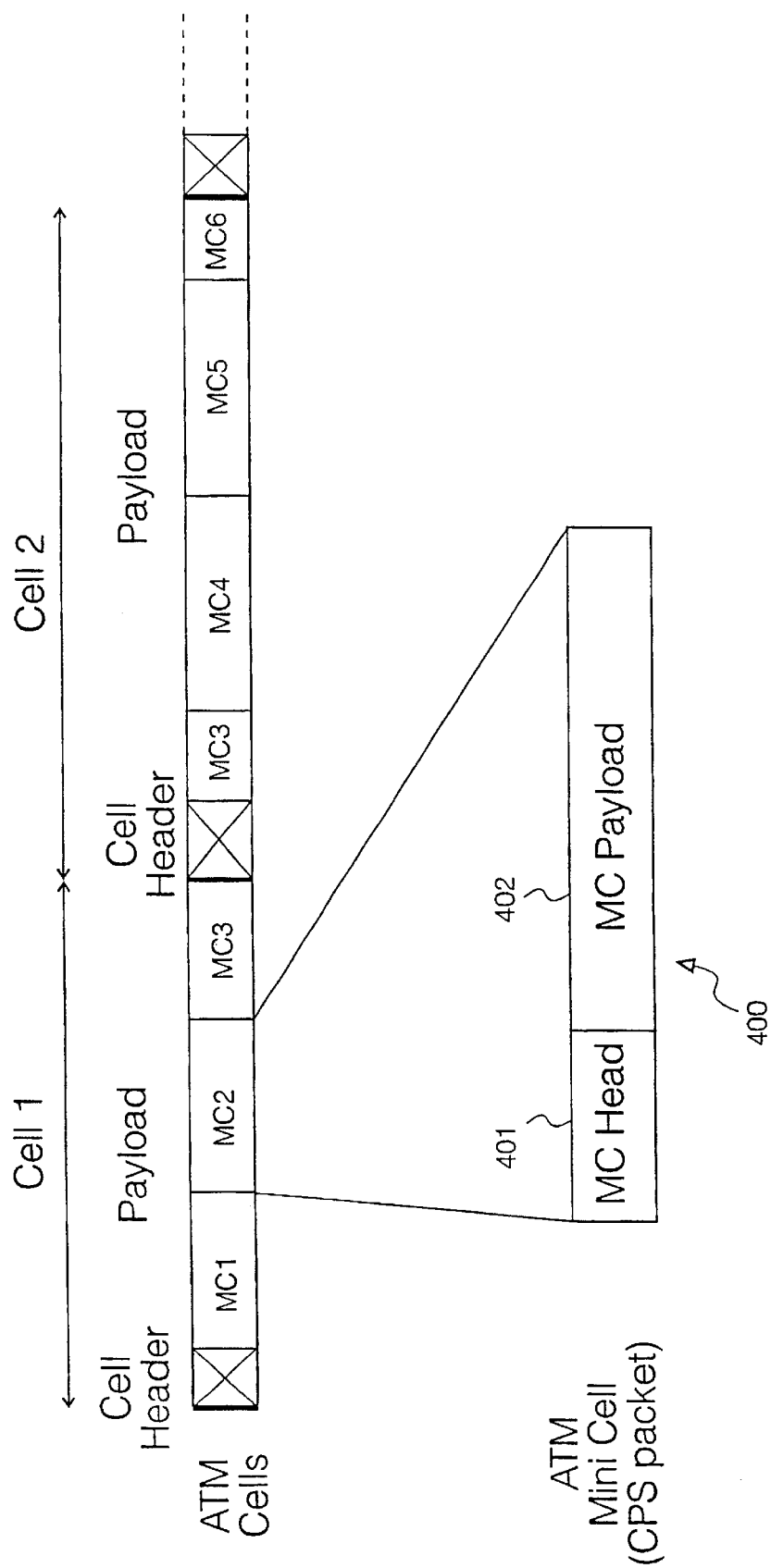
FIG. 4 illustrates a transmission series of asynchronous transfer mode cells, containing a plurality of asynchronous transfer mode adaptation layer type-2 mini-cell (common part sub-layer packets)

Referring to FIG. 4 herein, there is shown schematically a series of two conventional ATM cells, each containing a plurality of conventional ATM, CPS Protocol Data Unit (CPS-PDU) mini-cells MC1–MC6. A single mini-cell 400 comprises a 3 byte mini-cell header 401, and a variable length mini-cell payload 402 for carrying data traffic. In AAL-2 one or more mini-cells may comprise the payload of an ATM cell, occupying a maximum of 48 octets of the ATM cell, the remaining 5 octets of the ATM cell being reserved for the ATM cell header. An ATM mini-cell may cross an ATM cell boundary. For example in FIG. 4 first ATM cell, cell 1 contains mini-cells MC1, MC2 and a portion of a further mini cell MC3. The remaining portion of the mini-cell MC3 occupies a payload of second ATM cell, cell 2.

Figure 5:
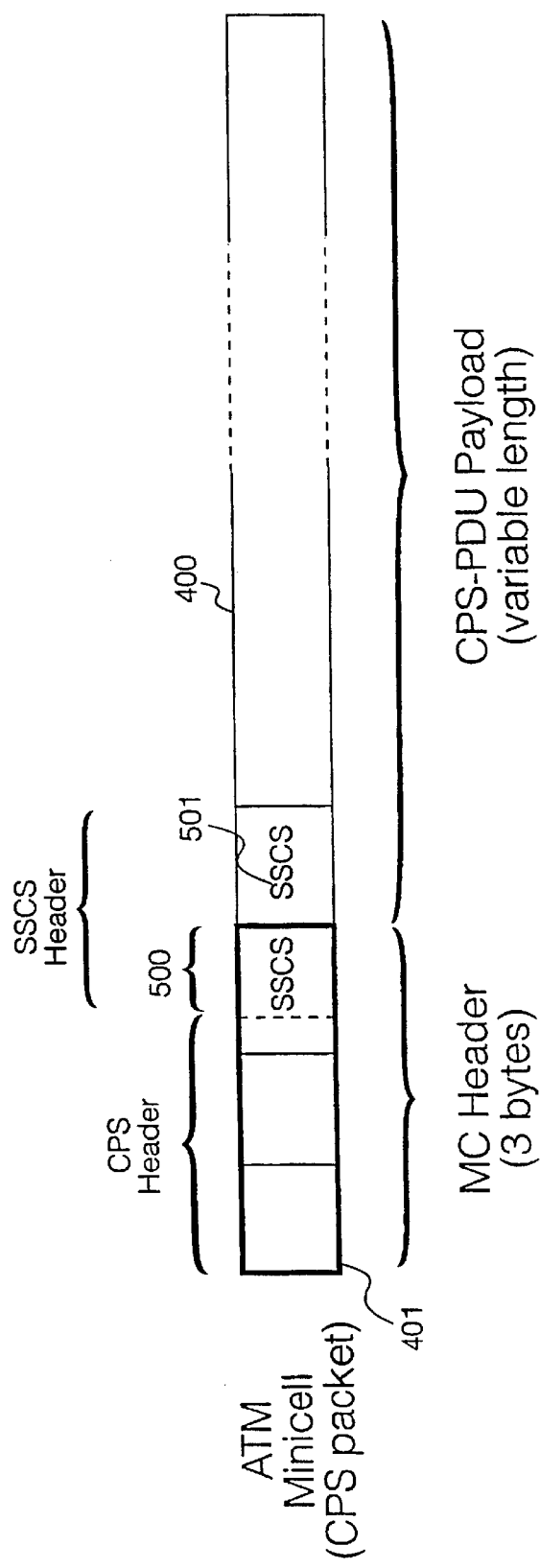
FIG. 5. illustrates schematically a layout of an asynchronous transfer mode common part sub-layer packet mini-cell.
Figure 6:
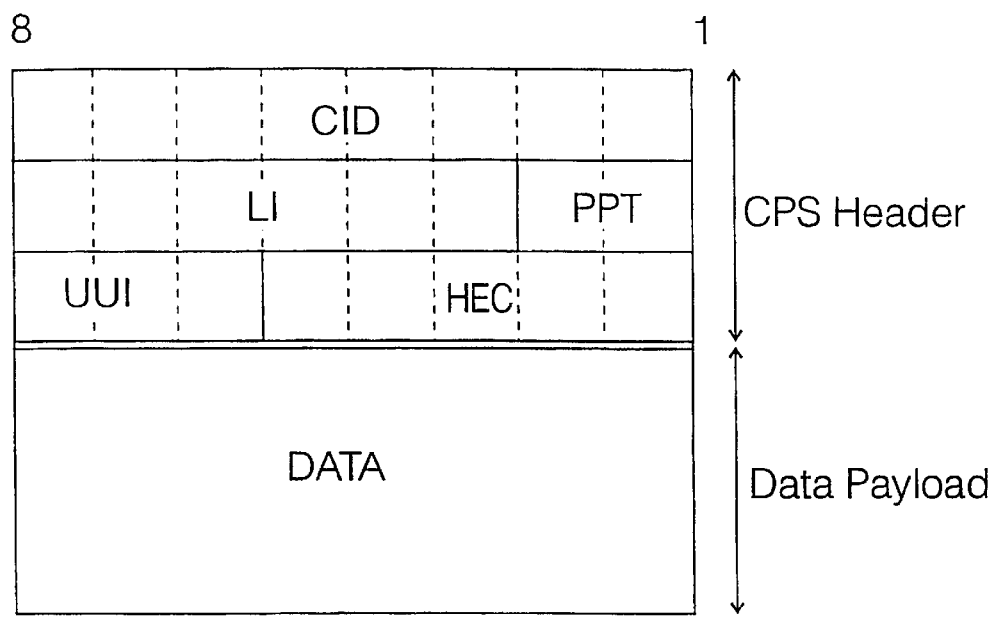
FIG. 6 illustrates schematically an asynchronous transfer mode mini-cell common part sub-layer protocol header, and a mini-cell data payload.
Figure 7:
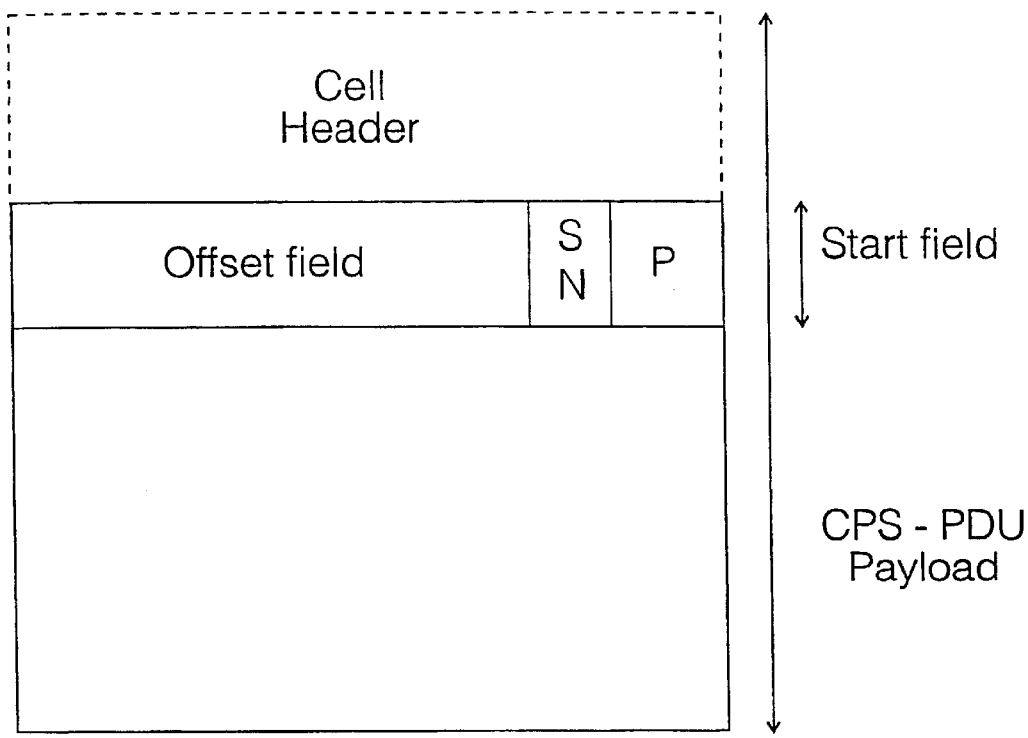
FIG. 7 illustrates schematically a start field header in an asynchronous transfer mode mini-cell data payload.

In AAL-type 2 the mini-cell header 401 is split into two parts; firstly a common part sub-layer (CPS) packet header and secondly a service specific convergence sub-layer (SSCS) packet header. The common part sub-layer includes basic control information which is common to all mini-cells transmitted, such as a user identification (UID) indicating the number of users of a virtual channel, (an ATM virtual channel can have up to 256 individual users); a length indicator (LI) field indicating the length of the mini-cell payload, the mini-cells being capable of having variable length payload; and a cyclic redundancy data (CRC) field to protect the content of the mini-cell header against errors. The mini-cell header is of length 3 bytes. Within the mini-cell header there are left five free bits allocated for the service specific convergence sub-layer (SSCS) packet header information. The service specific convergence sub-layer packet header constitutes a user definable field, such that users can adapt the service specific convergence sub-layer header to tailor the ATM mini-cell to their own requirements. Users have an option to place service specific convergence sub-layer information as part of the mini-cell payload 400, or can place the SSCS information in the vacant 5 bits in the mini-cell header 401. Thus, for example if a user wanted to include digital error protection information for a service, this could be included in the payload of the mini-cell. In FIGS. 5, 6 and 7 herein, there is shown schematically the 3 byte mini-cell header, comprising the common part sub-layer (CPS), and the five free bits reserved for the service specific convergence sub-layer (SSCS), and also positioning of elements of the service specific convergence sub-layer at a location 501 in the mini-cell payload 400.

In the AAL-type 2, ATM cells are filled with CPS-PDU mini-cells, such that data from different users fill respective different mini-cells one user per mini-cell. Thus, using a single channel adaptation (SCA) method for example the from three different users can be transmitted in a single ATM cell, by incorporating three separate mini-cells as the payload of the ATM cell, each mini-cell containing data from a respective user data source. Thus, the ATM mini-cells can be transmitted asynchronously within the ATM cell structure, and a number of users may be multiplexed into the payload of an ATM cell, using a plurality of mini-cells. However, filling the mini-cells with data still incurs a packetization delay, as does filling an ATM cell. For transmission of very low bit rate services, which are delay sensitive, it is only feasible to include a small number of samples of the low bit rate data in the mini-cell payload, before the packetization delay becomes excessive. For example, at very low bit rates, it may only be possible to include 3 or 4 octet samples in a mini-cell payload before the packetization delay in filling the mini-cell becomes too great. The CPS packet header needs to be added to this payload, resulting in a mini-cell comprising a 3 byte CPS packet header, and 3 or 4 bytes of payload data. Thus, for low bit rate data, a 3 byte mini-cell header constitutes an excessive overhead for a 3 or 4 byte data payload, resulting in poor bandwidth utilization at low data rates.

Figure 8:
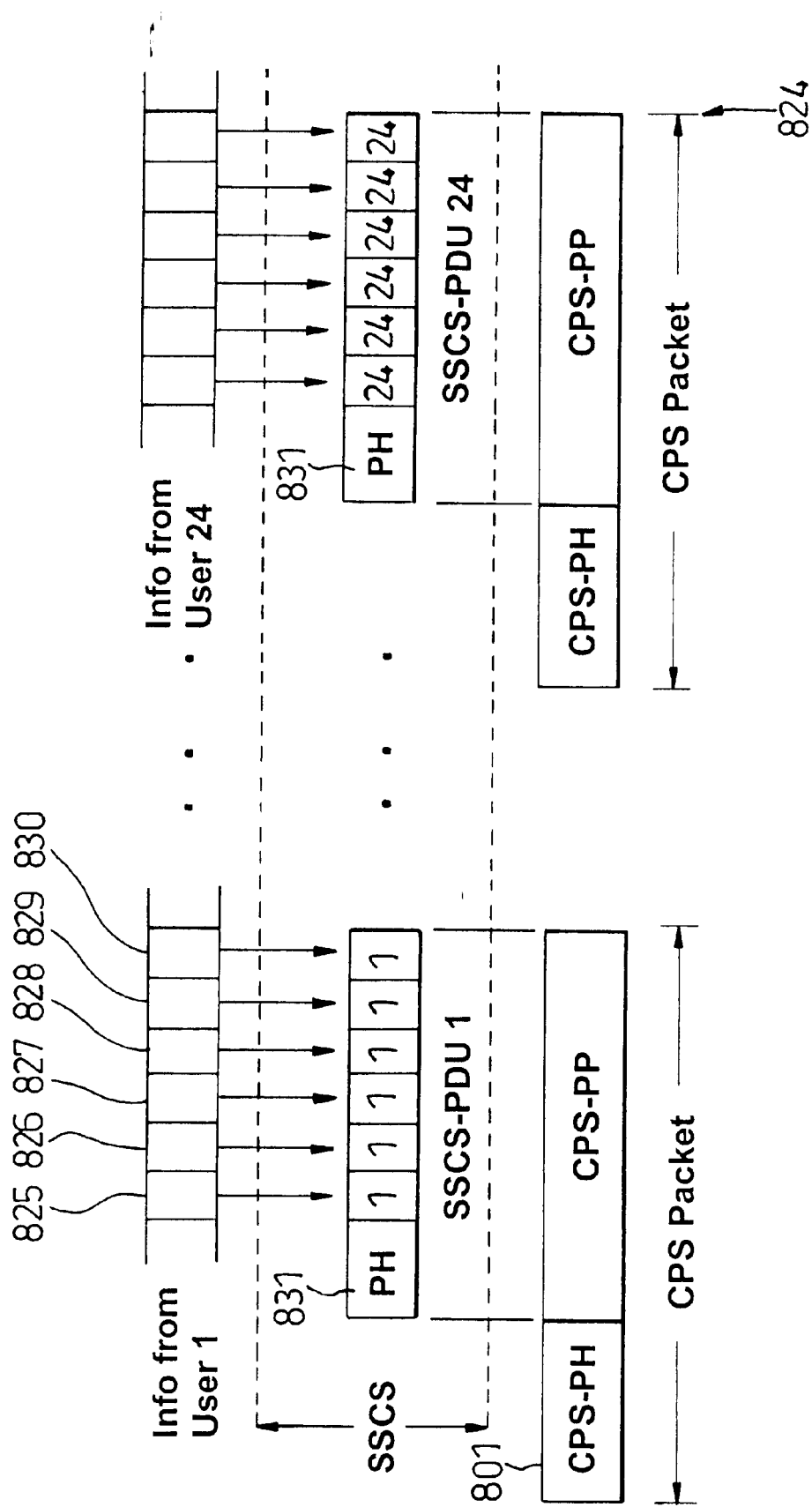
FIG. 8 illustrates schematically assembly of data of a plurality of user data sources into a plurality of CPS packet mini-cells in accordance with a single channel adaptation (SCA) method.

Referring to FIG. 8 herein, there is illustrated packetization of multi-user data from a plurality of low bit rate synchronous user data sources using a SSCS-single channel adaptation mechanism. In SSCS-SCA, each mini-cell carries data of a single user data source. For example in FIG. 8, mini-cell 800 carries data from User 1 and mini-cell 824 carries data from User 24. Six bytes of traffic data 825–830 are encapsulated in a service specific convergence sub-layer packet header 831 to form a first service specific convergence sub-layer packet data unit SSCS-PDU1. The SSCS-PDU1 comprising 6 bytes of user data from User 1, plus the SSCS packet header 831 are encapsulated in the CPS packet header 832 to form CPS packet mini-cell 801. In this case, the mini-cell 801 carries 6 bytes of user information with a minimum 3 byte packet header overhead. Similarly, for further users, User 2, to User 24 whose respective data are encapsulated in further respective mini-cells. The resulting CPS packet mini-cells are multiplexed together to form ATM cell payloads which are subsequently transmitted over the physical transmission media, the node devices 300, 301, and link 303 of the network operating in accordance with the ATM layer protocols. Using SSCS-SCA, information from each single user data source is used to construct a corresponding respective SSCS-SDU, containing that single user's data. To each SSCS-SDU is prepended a respective SSCS packet header, to form a series of SSCS-PDU's. To each of these is prepended a CPS packet header to form a respective set of CPS packet mini-cells. Each CPS packet mini-cell contains information from a single user, and so a unique ATM adaptation layer-type 2 connection is established for the support of each user. Thus, in the CPS packet header, the user ID (UID) is therefore associated with one particular SSCS user. This means that every time an AAL-type 2 connection is set up for a new user, an AAL-type 2 negotiation procedure (ANP) is invoked to negotiate a user ID (UID) value for assignment to that connection. Similarly, every time a user is released an AAL-type 2 negotiation procedure (ANP) is invoked to return that connection's user ID value to an unassigned state.

Whilst single channel adaptation is efficient for many service types, for some service types, in particular for low data rate services, the bandwidth utilization using SCA is inefficient.

Figure 9:
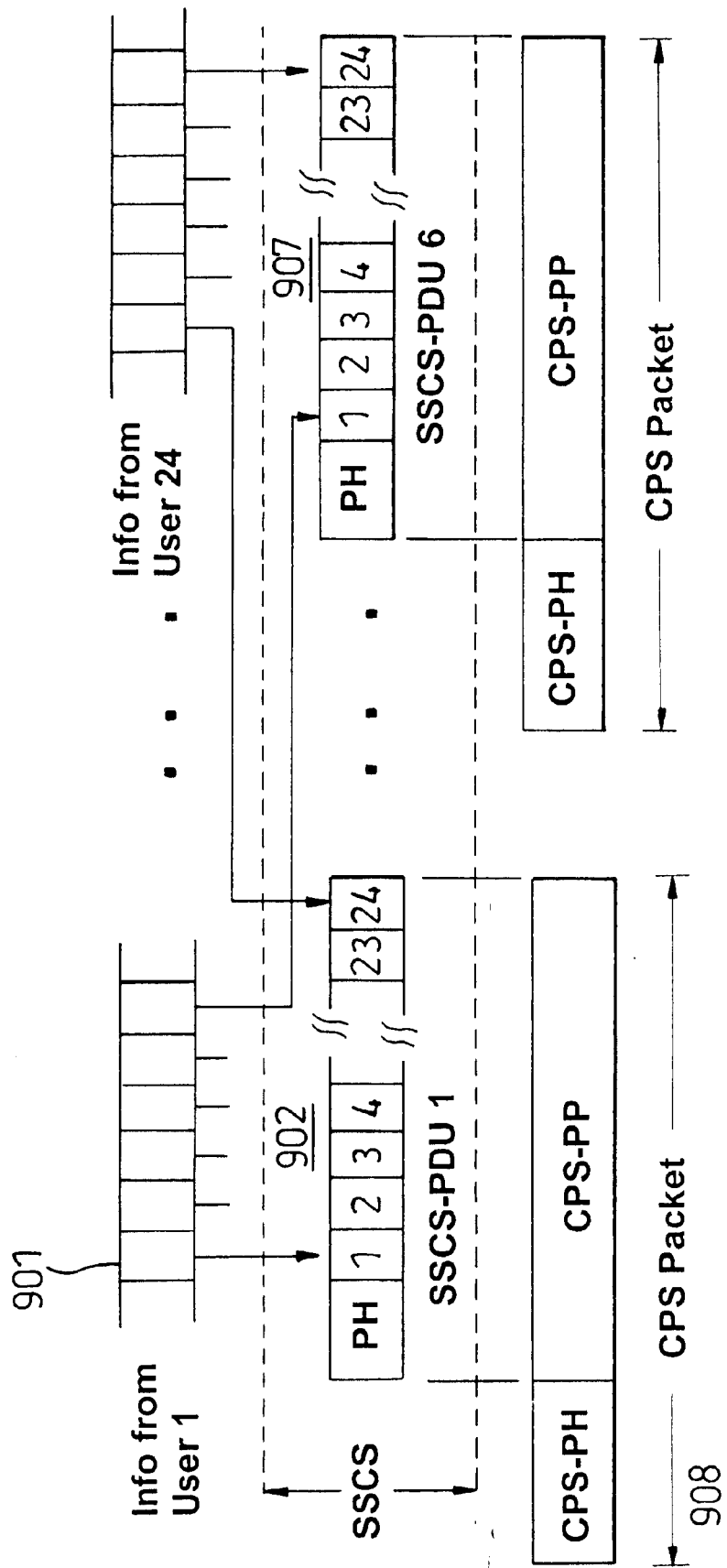
FIG. 9 illustrates schematically assembly of data from a plurality of user data sources into a plurality of CPS packet mini-cells in accordance with a multiple channel adaptation method (MCA) according to a specific method of the present invention.

Referring to FIG. 9 herein and hereafter generally, there is illustrated schematically another method of multiplexing a plurality of user data sources for transmission point to point across an ATM network in accordance with the best mode for carrying out the present invention. The specific methods and processes described hereafter not to be taken as limiting to the general scope of the invention. In FIG. 9, a plurality of network users, (User 1 to User 24), each generate synchronous user data which is used to construct a multiple channel adaptation (MCA) CPS packet mini-cell in which the payload of the mini-cell represents a multiplex of the data from the multiple users. As shown in FIG. 9, a data octet 901 from a data source of User 1 is multiplexed with data octets from respective users; User 2, User 3 . . . User 24, to form a payload of a first SSCS protocol data unit 902. Subsequent SSCS-packet data units carrying subsequent data octets of the plurality of uses are constructed similarly. For example where each user generates 6 bytes of data, for each user one byte of data is included in separate SSCS-protocol data units, SSCS-PDU's 1–6, culminating in the sixth SSCS-protocol data unit 907. In this manner, since a byte of data from each of the plurality of user data sources are multiplexed into a single SSCS-protocol data unit, before a next byte of information from the first user is considered, the first byte of information from each of the plurality of data sources can be packetized without waiting for the next byte of data to arrive from each or any user data source. The resultant SSCS protocol data units are prepended with a CPS packet header 908, resulting in CPS packets (mini-cells). These are multiplexed together to form the ATM cell payloads which are transmitted over the physical network. Each mini-cell is incorporated into one or more ATM cells for transmission across the network.

Thus, for example in the case of 24 users, using a multiple channel adaptation mini-cell (CPS-PDU-MCA), the mini-cell 902 comprises CPS packet header 908 and mini-cell payload (CPS packet payload) 909. The payload, rather than representing data from a single user, now represents multiplexed data from multiple users, so the user data is multiplexed on a frame by frame basis. Thus, if it is required to transmit user data of 24 different users from one point to another point, with each user generating an octet of data every 125 μs, which would be the case for example for user data generated using the known pulse code modulation (PCM) method, then the 24 individual octet samples from the 24 users can be multiplexed into the payload of a single mini-cell. Information on the order in which the user data is packed into the mini-cell is not carried in the mini-cell header, but is transmitted separately via the ATM adaptation layer type 2 negotiation procedures (ANP). ANP messages are sent between two ATM adaptation layer type 2 entities (the node devices) to control assign removal, and status of AAL-type 2 channels. Because the order in which the user data is packed into the mini-cell payload is known at the transmission end, and transmitted to the receiver entity in advance of transmitting the mini-cells, at the receiver end, the data can be unpacked from the mini-cell payload in known order and de-multiplexed into the 24 separate sets of user data.

Typical ANP messages include:

Assignment request

Assignment confirm

Assignment denied

Removal request

Removal confirm

Status poll

Status response

For example, in FIG. 3 an assignment request message is sent by transmitting entity node device 300, and requests assignment of an AAL-type 2 channel. An assignment confirm message is sent by receiving entity, node device 301, and confirms assignment of an AAL-type 2 channel. An assignment denied message is sent by an AAL-type 2 entity which denies assignment of an AAL-type 2 channel. A removal request message is sent by an AAL-type 2 entity which requests removal of an AAL-type 2 channel. A removal confirm message is sent by an AAL-type 2 entity which confirms removal of an AAL-type 2 channel. A status poll message is sent by an AAL-type 2 entity which polls a status of an AAL-type 2 channel. A status response message is sent by an AAL-type 2 entity which responds to a status poll of an AAL-type 2 channel. Specific proposals for implementing the ANP protocol can be found in reference 2 herein. Information concerning the addition or deletion of users data sources in the multiplexed multi-user data package is signaled to the receiving entity using the ANP protocol as described, before the change of number of users actually occurs.

Figure 10:
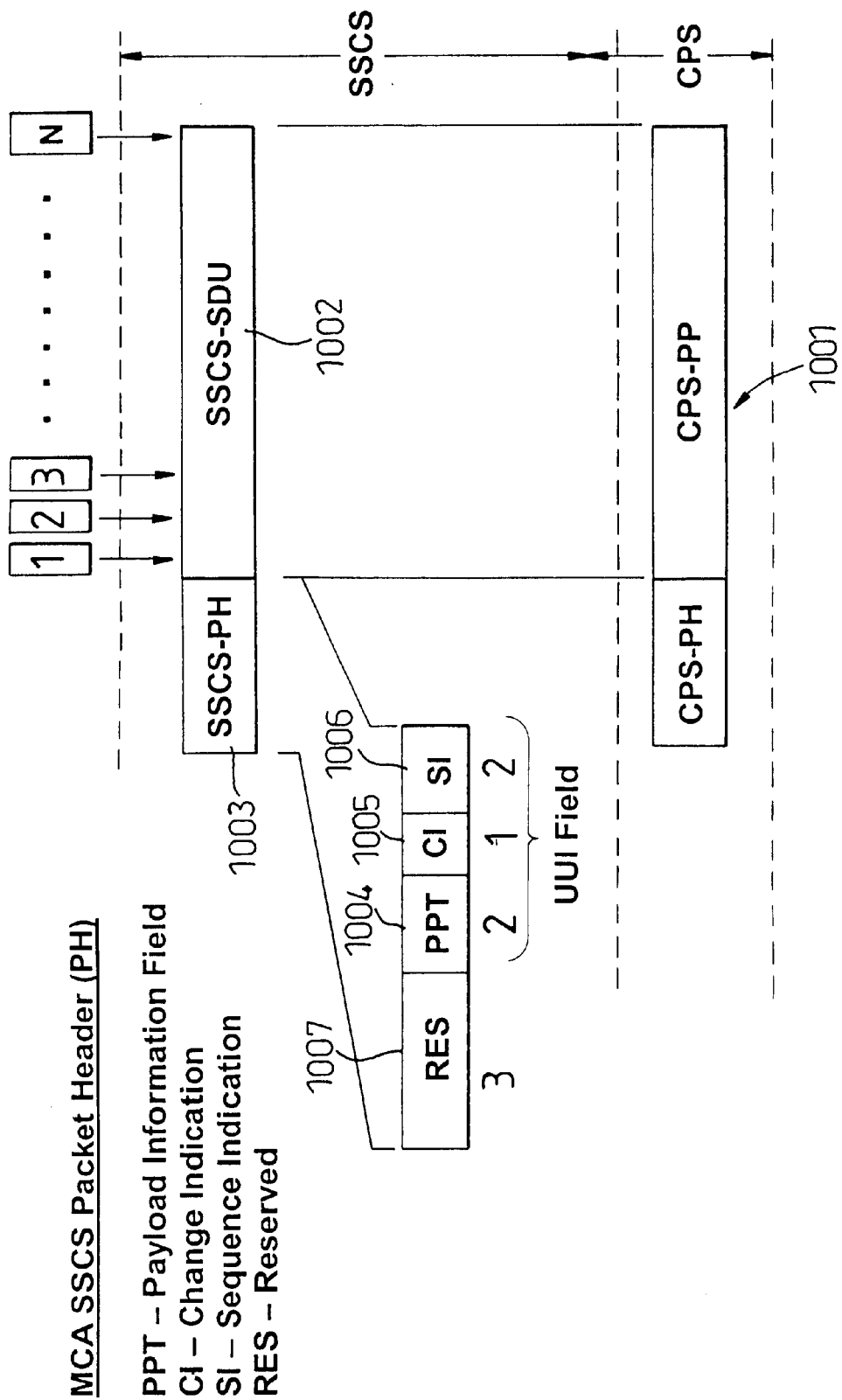
FIG. 10 illustrates schematically a method of assembling a CPS packet mini-cell including a data payload comprising a multiplex of data of a plurality of user data sources, and assembly of a common part sub-layer/service specific convergence sub-layer (CPS/SSCS) header in accordance with a multiple channel adaptation method.

Referring to FIG. 10 herein, there is shown a way of structuring of an SSCS packet header within a CPS packet of an ATM mini-cell 1001 implementing a specific method according to the present invention. A plurality N octets of data from a plurality N user data sources are multiplexed into data payload, service data unit packet 1002. SSCS packet header 1003 prepended to the service data unit 1002 comprises a 2 bit packet payload type field (PPT); a single bit change indication field (CI) 1005, a 2 bit Modulo 8 sequence indicator field (SN) 1006; and a 3 bit reserved field 1007. Using the SSCS packet header 1003 of FIG. 10 to prepend a multi-user multiplexed data packet 1002, information from multiple low bit rate sources can be multiplexed together into a trunk group data frame to achieve an improved bandwidth efficiency for a given bounded cell assembly delay. Irrespective of trunk group data frame size, the SSCS multi-channel access mechanism of FIG. 10 can be tuned to generate service data units of length approximately equal to the ATM cell payload size (maximum 48 bytes). This may yield an optimum balance between high bandwidth efficiency and elimination of potential error extensions. The size of the trunk group is deterministic, and at all times, a receiving entity node device has implicit knowledge of the length of the multi-user multiplexed packets which it receives. However, it is possible to change the size of the trunk group dynamically during the lifetime of a connection to accommodate changes in the number of low bit rate users. Changes in multi-user multiplexed data package size (ie the trunk group data frame) are signaled ahead using the ANP negotiation protocol, and the actual moment of implementation of the change of number of users is activated by transmission of the change indication (CI) bit signal within the SSCS packet header in which the change occurs, such that the receiving entity knows from the ANP negotiation process what the change in the number of users will be, and from the received mini-cells, the timing of when the change in number of users occurs.

Operation of the sequence indication (SI) field, continuation indication (CI) field and packet payload type (PPT) field will be described.

The 2 bit sequence indication field (SI) shown in FIG. 10 herein, is used in conjunction with the 1 bit start field sequence number (SN) in the start field of every CPS-packet data unit, as shown in FIG. 7 herein. The 2 bit sequence indication field (SI) provides a mechanism for guarding against the loss or mis-delivery of a mini-cell. For successive mini-cells transmitted, the sequence indication field is incremented through the cycle 00, 01, 10, 11 and then back to 00. The receiving node device is configured to read the sequence indication field and check the cyclic incrementation of the sequence indication field. Any changes to the cycle indicate that a mini-cell has been lost. Particularly in synchronous services, it is important to ensure that an end to end phase relationship is maintained, and detection of lost or miss-delivered mini-cells is important. Generally, loss of phase may lead to error extension, particularly for modem traffic, where the modem requires a significant duration in order to regain synchronization, once synchronization is lost.

Figure 11:
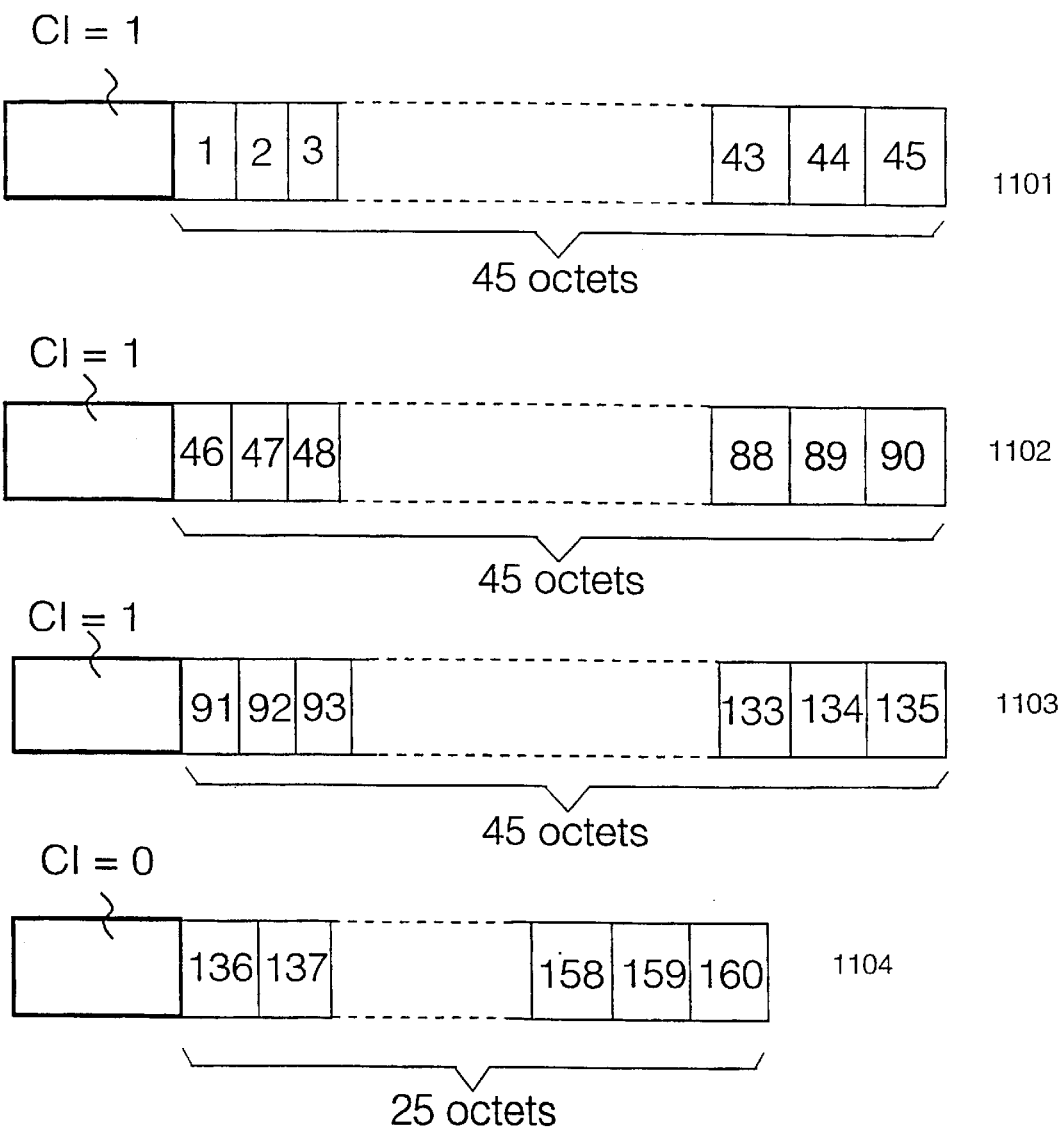
FIG. 11 illustrates schematically a plurality of CPS packet mini-cells containing a data payload of a single trunk group data frame comprising multiplexed data from a plurality of user data sources.

The single bit continuation indication field (CI) can be used to incorporate a large trunk group data frame, ie a long sequence of multiplexed users, into a plurality of mini-cells. For example, in FIG. 11 herein, 160 octets from 160 user data sources respectively are assembled into a single trunk group data frame. Referring to FIG. 11 herein, first to fourth successive CPS packet mini-cells 1101–1104 respectively each have a respective data payload which is filled with the data octets from the multiple users. The trunk group is transmitted in the first to fourth mini-cells 1101–1104 by filling data payload of the first mini-cell 1101 with octets from users 1 to 45, filling data payload of the second mini-cell 1102 with octets from data users 46 to 90, filling data payload of third mini-cell 1103 with octets from data users 91 to 134, and filling data payload of the fourth mini-cell 1104 with octets from data users 136 to 160. In the SSCS packet header 1003 of each mini-cell, the single bit continuation indication field (CI) can adopt a value of 0 or 1. The value 1 is used to signify that at the end of the mini-cell containing the continuation indicator 1, the data payload continues into a subsequent mini-cell. Thus, in FIG. 11 first mini-cell 1101 containing continuation indicator value 1 has a data payload part of the trunk group data frame which continues into subsequent second mini-cell 1102. Similarly for mini-cells 1102 and 1103, which also contain continuation indicator value 1. The fourth mini-cell contains a continuation indicator of value 0, indicating that the data payload of the fourth continuation cell does not continue into a subsequent fifth mini-cell.

For mini-cells shown in FIG. 11 a maximum data payload of 45 octets is selected as a default condition. This value has been selected to coincide with the suggested default length of mini-cell stated in reference 2 herein. If very large trunk group payloads are assembled in a single large mini-cell, then several successive ATM cell payloads could be generated without any CPS protocol control information. Under these circumstances, a single error in the data payload could lead to a prolonged error extension, thus degrading the overall error performance of the ATM communications link. In the present method, although the maximum mini-cell payload size of 45 octets is complied with, there is no restraint placed on the maximum size of a trunk group itself which can be transmitted. Mini-cells having a continued payload, and having a continuation indicator value of 1 are set at single constant length of the default mini-cell payload size of 45 octets. For mini-cells having payloads which are not continued to a successive mini-cell, the size of the mini-cell payload is variable to accommodate the remainder of the trunk group data. Since the receiving entity has an implicit knowledge of the length of the trunk group, due to prior signaling via the ANP mechanism, the lengths of both the continued mini-cell payloads, and the final un-continued mini-cell payload are known implicitly. However, whilst the best mode herein contemplates a mini-cell of maximum payload 45 octets, the invention is not restricted to such mini-cell payload length. In a further specific method according to the present invention, the mini-cell payload size of a continued mini-cell may be set at an optional maximum mini-cell payload length of 64 octets.

The two bit packet payload type field (PPT) is used both to designate the type of packet payload, whether operation and maintenance (OAM) data, or user data, and to dynamically indicate in which mini-cell a change of number of users in the trunk group occurs. In the 2 bit packet payload type field, the value 11 is assigned as indicating that the mini-cell contains operation and maintenance signal information (OAM). In this case, the data payload of the mini-cell contains operation and maintenance signal information, and not trunk group user data. The other three states of the 2 bit packet payload type (PPT) field are allocated as follows:

00—indicates an SSCS packet which carries user information (ie trunk group information of the multiplexed multi-user data).

01—indicates an SSCS packet carrying user information, the same as value 00 above.

Values 00 and 01 are used to alternate with each other each time there is a change in number of users carried over a connection.

10 indicates an SSCS packet which is the first packet of a group of SSCS packets containing data of a different number of users as the immediately preceding SSCS packet. In otherwords 10 indicates a first SSCS packet containing data of a new plurality of users.

Referring now to table 1 herein, there is shown a state table which may be used to decode the packet payload type (PPT) fields when a change in trunk group structure size has occurred. In the table "same" and "inverted" imply that the PPT flag is equal to 00 or 01. Same means that it is the same value as the last received user mini-cell, whilst inverted means it is the opposite value.

TABLE 1

| P1 | SN | Action |
|---|---|---|
| Same | X + 1 | Normal operation - no structure size change detected |

TABLE 1-continued

| P1 | SN | Action |
|---|---|---|
| Same | X + 2 | Missing mini-cell detected - no structure size change detected |
| 10 | X + 1 | Structure size change detected - new size start this mini-cell |
| 10 | X + 2 | Missing mini-cell-detected - structure size change detected, started new mini-cell |
| Inverted | X + 2 | Missing mini-cell detected - structure size change detected, started in previous mini-cell |
| All other combinations | | Errored condition - take mitigating action as necessary, ie verify/resync at next mini-cell |

Figure 12:
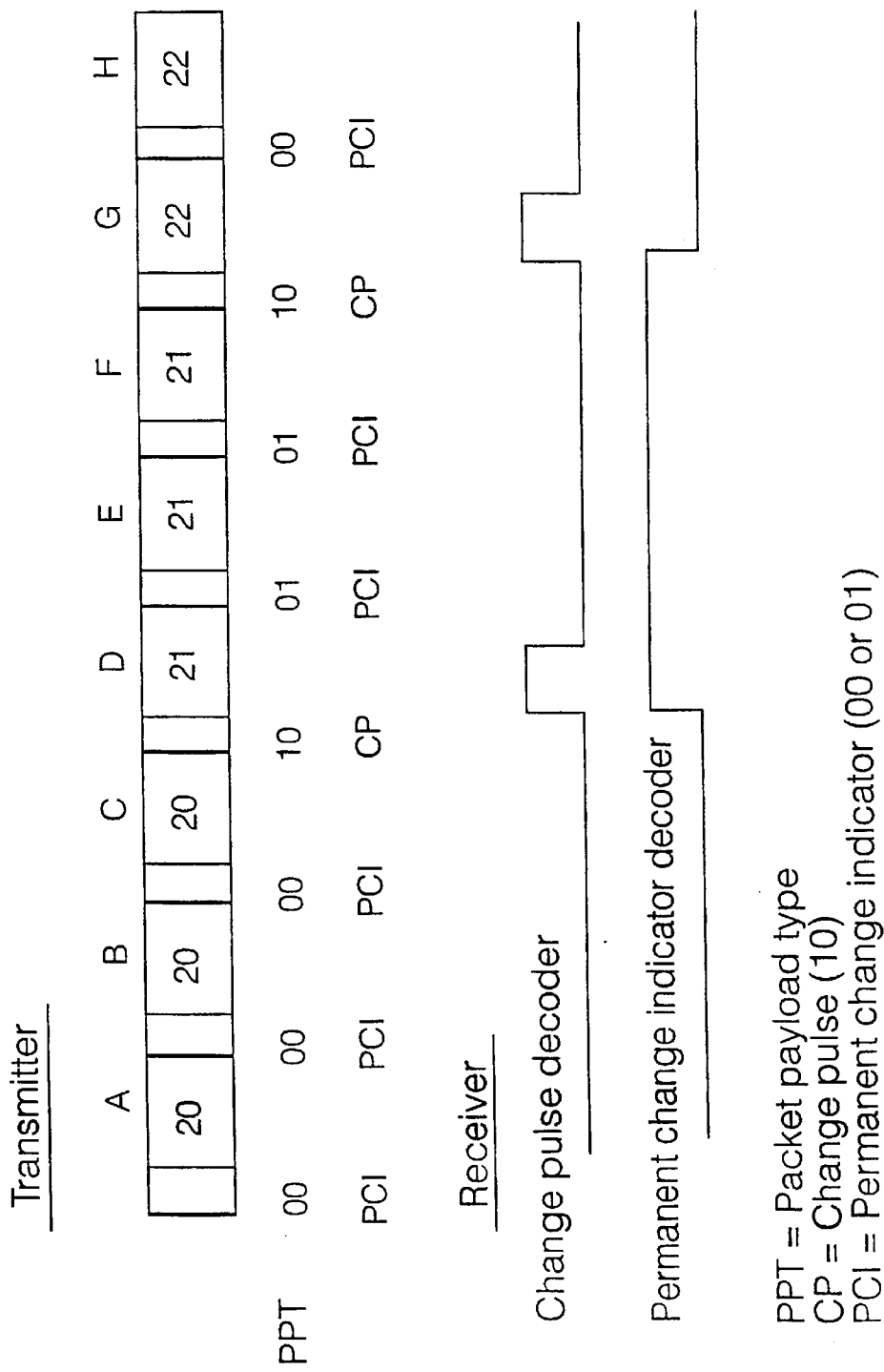
FIG. 12 illustrates schematically a series of CPS packet mini-cells transmitted across a communications network in accordance with specific methods of the present invention, and a result of decoding signaling information comprising the transmission, in accordance with further specific methods according to the present invention.

Since the values 00 and 01 are both used to indicate SSCS packets which carry user information, but are two different states, a transition from 00 to 01 or from 01 to 00 is used to indicate a permanent change in the size of the mini-cell payload has occurred. For example. Referring to FIG. 12 herein where mini-cells A to H are transmitted, and the number of users in a trunk group varies from 20 users, to 21 users and then to 22 users, the packet payload type indicator values 00, 01 are used to indicate permanent changes of user number as follows. Firstly the change in user number from 20 users to 21 users is signaled from the transmitter node entity to the receiver node entity in advance of the change, using the ATM adaptation layer type-2 negotiation procedure (ANP). The number of users in the trunk group is then changed at the transmitter end, and the new number 21, of users, are included in the trunk group. In the first mini-cell (mini-cell D) carrying data from the new trunk group of 21 users, the user data payload of the mini-cell is packetized by adding the SSCS header, including in the packet payload type field change pulse signal, 10. At the receiver, a change pulse decoder apparatus decodes the received SSCS packet header and determines from the PPT value 10 that a change in user number has occurred in the trunk group, starting at mini-cell D. The receiver has information in advance of mini-cell D, of the actual number of users in the new trunk group, since this has been transmitted earlier using the ANP protocol. On receiving the change pulse signal PPT value 10 the receiver may then allocate the 21 users octets to a respective 21 user end point destinations, taking the timing of this allocation from the change pulse indicator value 10 of the packet-payload type field.

In the next mini-cell, mini-cell E the packet payload type field (PPT) changes to the alternate value of the permanent change indicator (PCI), ie 01. The permanent change indicator PPT value 01 indicates that a change in the number of users of the trunk group has been made. The value of packet payload type is maintained at the new value of permanent change indicator PPT value, 01 for as long as the number of users in the trunk group remains the same, in this case up to mini-cell F.

New data concerning a new number of users of the trunk group is signaled ahead using the ANP protocol to the receiver, during transmission of mini-cells D to F, to enable the receiver to set up for a new change of trunk group user at mini-cell G. In this example, mini-cells G, H include trunk data from 22 users, effective as from mini-cell G. Data from the new number of user data sources of the trunk group are multiplexed into a trunk group frame which is transmitted in mini-cells G, H and subsequent mini-cells. At the beginning of the first mini-cell containing the amended number of trunk group users, ie mini-cell G, the PPT field of mini-cell G contains the value 10, being the change pulse CP signal. At the receiver, the PPT field value 10 is decoded as indicating that the new number of users in the trunk group is effective as from mini-cell G. The decoder proceeds to de-multiplex mini-cell G and subsequent mini-cells in accordance with the revised ANP information indicating that there are now 22 users in the trunk group and received multiplexed data octets of the 22 user data sources are sent to the corresponding respective 22 user destinations at the receiver switch. In the next mini-cell following the mini-cell G containing the change pulse, the PPT field reverts to the other permanent change indicator value 00.

Figure 13:
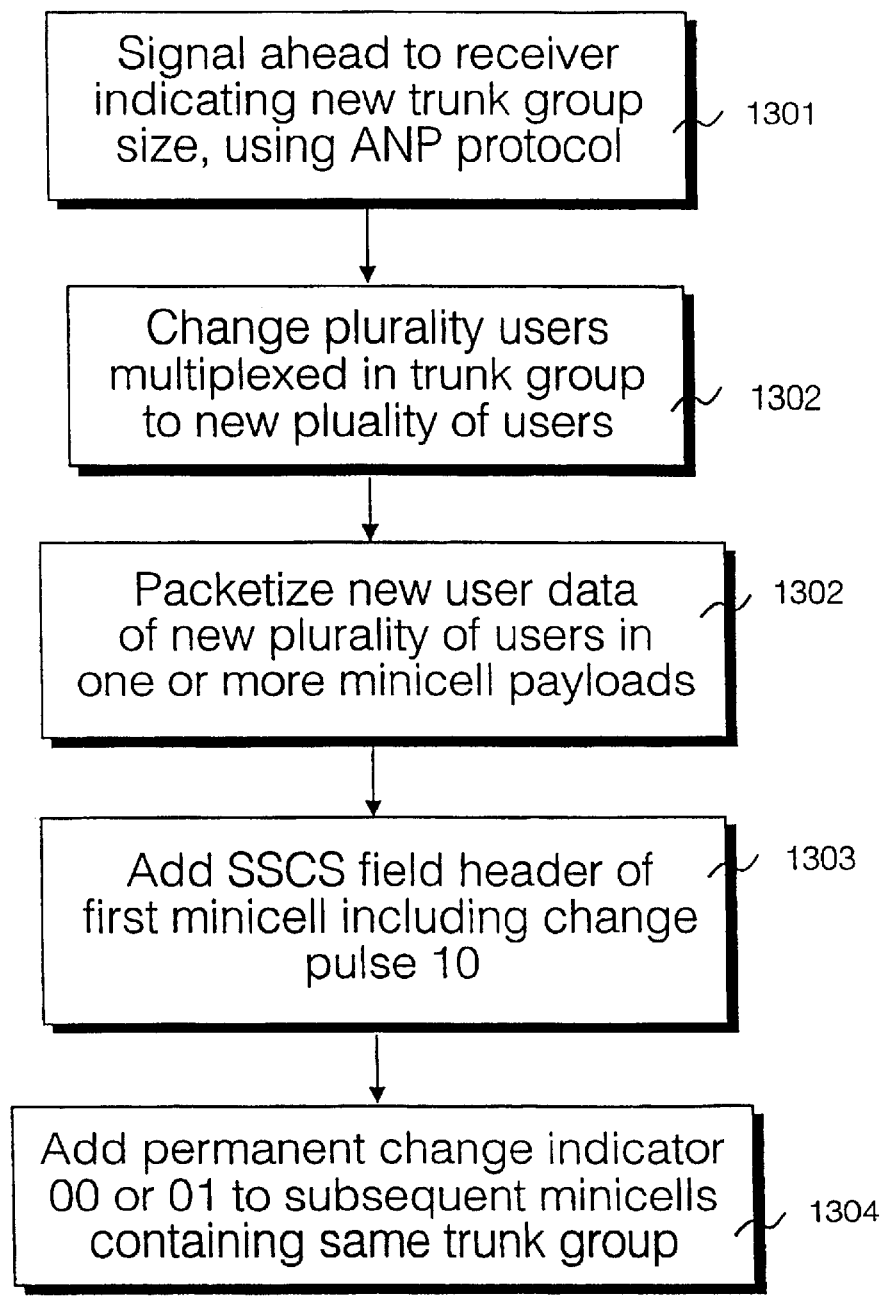
FIG. 13 illustrates schematically in overview, a signaling process according to a specific method of the present invention.

Referring to FIG. 13 herein, a general overview of a transmission method is shown. In step 1301, the transmitter signals ahead to the receiver, indicating a new trunk group size, using the ANP protocol. In step 1302, the number of users of the trunk group are changed and data from the new plurality of users are multiplexed into a new trunk group frame. In step 1303, the trunk group frame containing the new plurality of user data is packetized into one or more mini-cell payloads. To each mini-cell payload is added an SSCS field header. To the first mini-cell which carries the first trunk group frame having a new plurality of users, there is added in the PPT field the change pulse, value 10 in step 1304. In step 1305 to subsequent mini-cells containing information from the same trunk group frame, there is added the permanent change indicator value of 00 or 01. The value 00 or 01 is selected as being a different value to the previous permanent change indicator value used for mini-cells carrying precious trunk group frames of the previous, different plurality of users.

Figure 14:
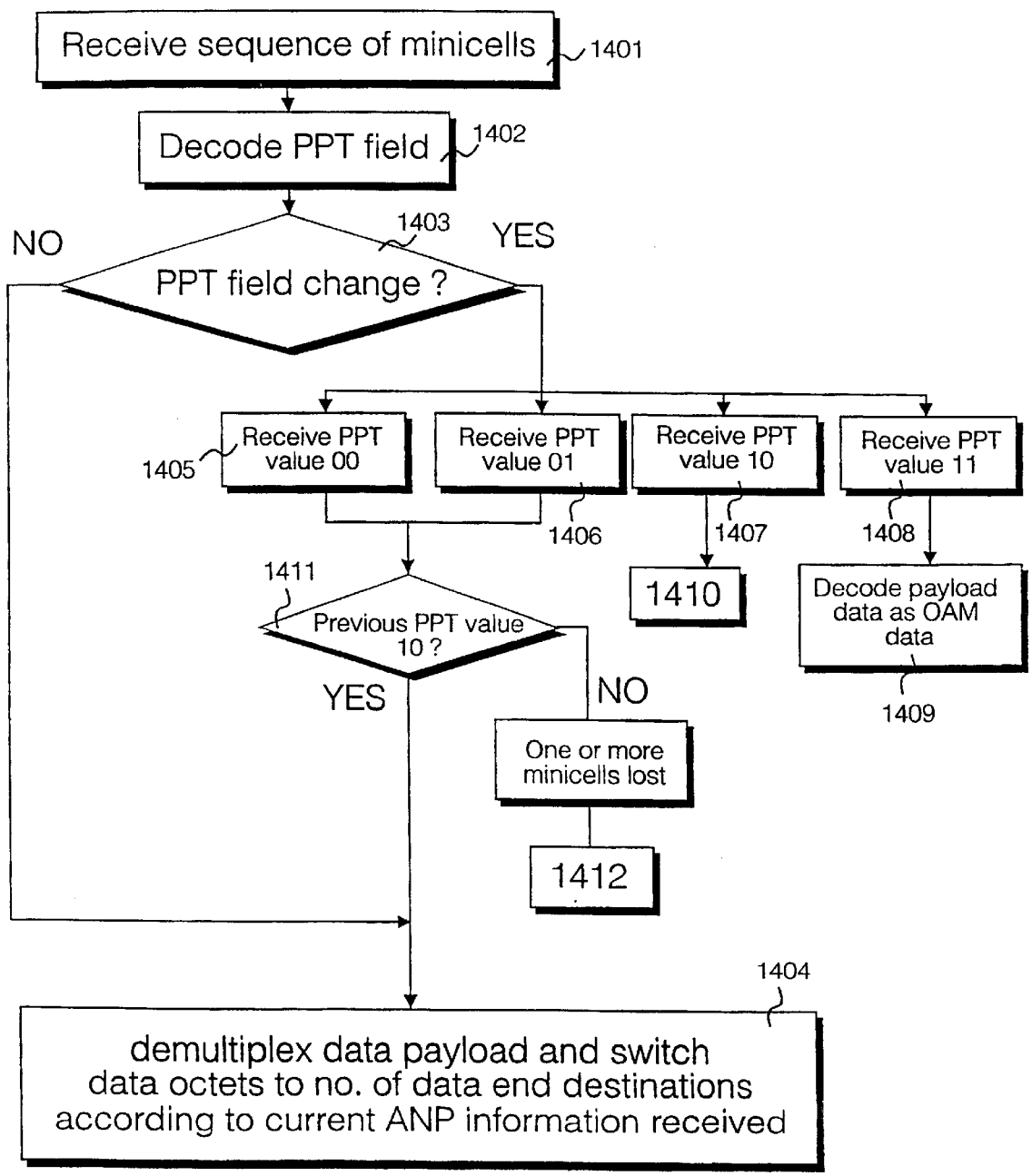
FIGS. 14 to 16 illustrate schematically in overview, a signal decoding process comprising specific methods of the present invention.

Referring to FIG. 14 herein, there is shown a general overview of a process implemented at the receiver entity for decoding the mini-cell header information and for allocating mini-cell data payloads to end user destinations. In step 1401, the receiving entity receives a sequence of mini-cells. In step 1402, the receiver decodes the PPT field in the SSCS header of the incoming mini-cells. If the decoder detects no change in the PPT field compared to a previously received PPT field of the previously received mini-cell, then in step 1404, the decoder de-multiplexes the data payload of the mini-cell and switches the data octets of that data payload of the mini-cell to the plurality of user end destinations specified in the currently held ANP information at the receiving entity. However, if in step 1403, the decoding receiver detects a change in the PPT field compared to the PPT field of the previously received mini-cell, then in steps 1405–1408, the receiving switch ascertains the value of the PPT field, either 00, 01, 10 or 11.

If the PPT field value is 11, then the receiving switch treats the data payload of the mini-cell containing the PPT field value as operation and maintenance (OAM) data in step 1409.

Figure 15:
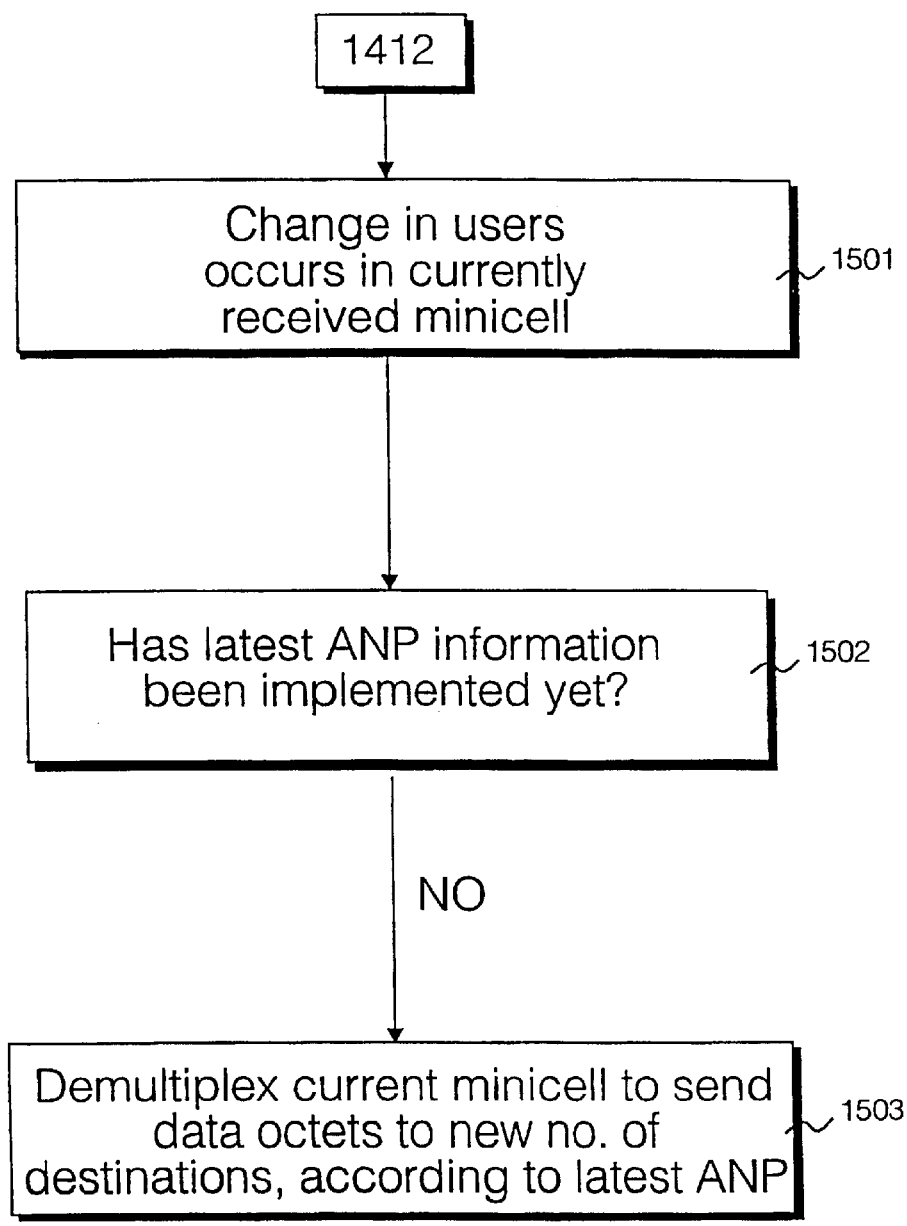

If the receiving switch decodes the PPT value of its currently received mini-cell as being 10 in step 1407, then the switch implements procedure upon change of number of users in a trunk group as illustrated in FIG. 15 herein. If the receiving switch decodes the PPT field of its current received mini-cell as being value 00 or value 01 in steps 1405 or 1406, then the receiving switch checks whether the previous PPT value of thee previous mini-cell was 10, indicating a change in number of users in the trunk group frame. If the PPT value in the previous mini-cell was 10 in step 1411, then the receiving switch treats the present mini-cell as the previous mini-cell, and de-multiplexes its data payload in accordance with the current information received from the ANP protocol, and distributes the data octets of the data payload of the current mini-cell to the appropriate plurality of users indicated in the ANP protocol information in step 1404. However, if the current mini-cell has a PPT value of 00 or 01, and the PPT value of the previous mini-cell was not 10, since in step 1403 it has been checked whether the PPT field has changed from that contained in the previous mini-cell, this indicates that an error has occurred, and one or more mini-cells have been lost during transmission. A lost mini-cell recovery procedure 1412 illustrated in FIG. 16 is then followed.

Referring to FIG. 15 herein, where the PPT value 10 is received in the current mini-cell at the receiving entity, this indicates that a change in number of users in the trunk group has occurred starting in the currently received mini-cell in step 1501. The receiving switch checks whether the latest ANP information has already been implemented yet in step 1502. If the latest ANP information has not yet been implemented, then the PPT value 10 indicates the timing of the change to the new plurality of users indicated by the latest received ANP information and in step 1503 the receiving switch de-multiplexes the current mini-cell data payload and sends data octets of the new plurality of users indicated in the ANP information to a corresponding respective new number of user destinations. If the latest ANP information received by the switch has been implemented in step 1502, then an error has occurred.

Figure 16:
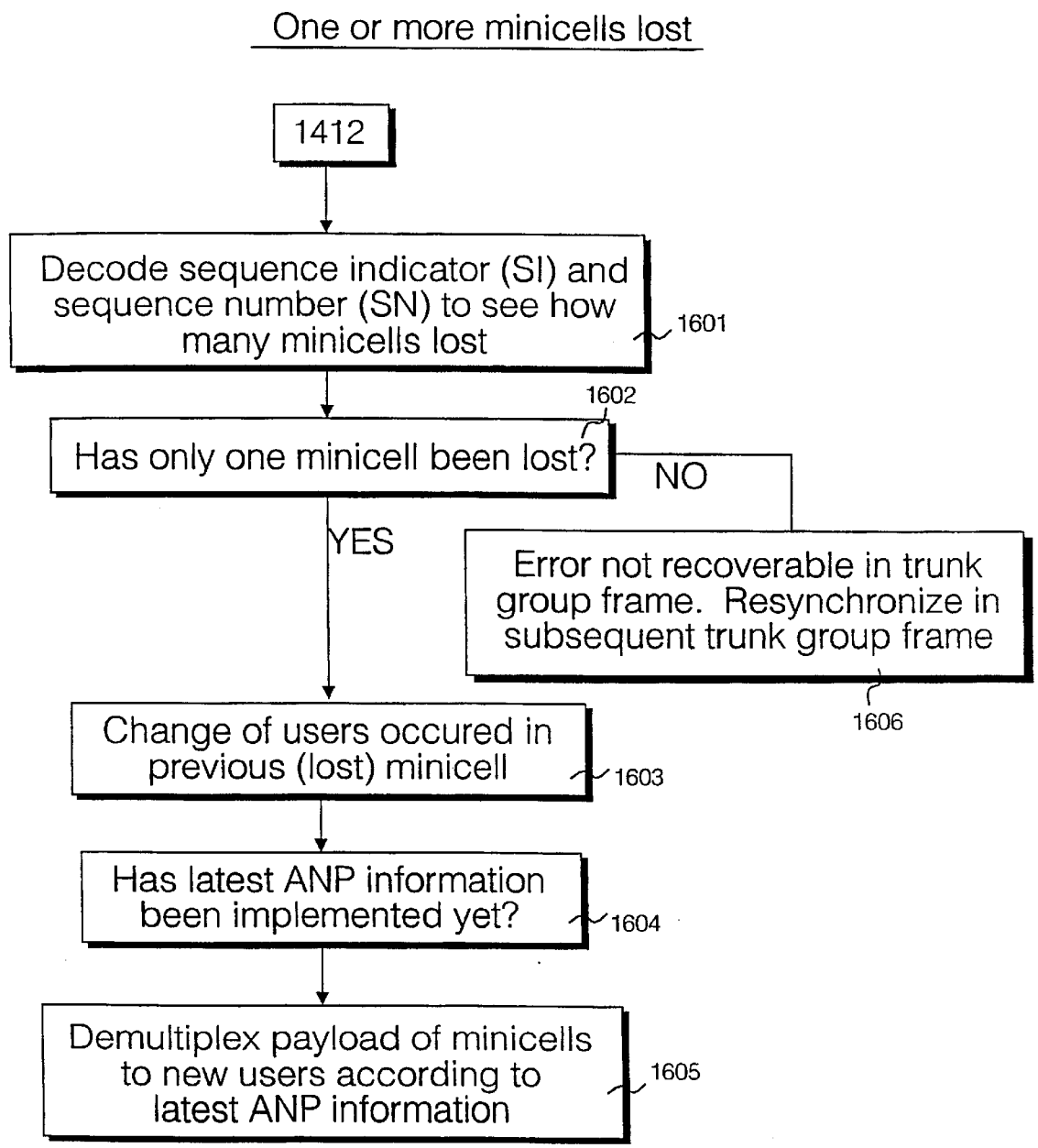

Referring to FIG. 16 herein, where the PPT values 00 or 01 are received, and this is a change from a PPT value in the previous mini-cell, and the value of the PPT field in the previous mini-cell was not 10, then this indicates that one or more mini-cells have been lost in transmission. In general, where mini-cells are lost during transmission this can cause de-synchronization of certain types of apparatus, for example modems, which take a large number of cycles to re-synchronize. Loss of a single mini-cell due to cell congestion can occur relatively commonly compared to other cell loss mechanisms. Thus, recovery of single mini-cell loss errors may improve the performance of customer equipment attached to ATM networks, by avoiding loss of synchronization. Where a large number of mini-cells are lost, for example more than one it may be that synchronization of modem equipment is lost in any case. In the best mode described herein, the PPT field can be used to recover single mini-cell loss errors as described in FIG. 16 herein. In step 1601, the 2 bit sequence indicator (SI) and the 1 bit sequence number (SN) are decoded to see how many mini-cells have been lost. In step 1602, if the switch determines that only one mini-cell has been lost then due to the change in value of the permanent change indicator from one mini-cell to the next, and knowing that the previous mini-cell did not contain the value 10, this indicates that the previous (lost) mini-cell must have been the mini-cell in which the change of users in the trunk group occurred. Therefore, in step 1604, the receiving switch checks whether the latest ANP information has yet been implemented, ie whether the switch is waiting for a change of number of trunk group users or not. If the switch determines that the latest ANP information has not yet been implemented, since the switch has knowledge that the change of user has occurred in the previous (lost) mini-cell in step 1603, then in step 1605, the switch can continue to de-multiplex the payload of the currently received mini-cell and distribute data octets to the new plurality of users specified in the latest ANP information to be received. If in step 1602 the switch, having checked the sequence indicator and sequence number determines that more than one mini-cell has been lost, then an error has occurred. The error may or may not be recoverable depending upon how many mini-cells have been lost and modem equipment at the user destinations may or may not be able re-synchronize in a subsequent trunk frame in step 1606.

However, due to the presence of the permanent change indicator (PCI), the receiving user equipment will recover synchronization eventually. Thus, the loss of one mini-cell is fully recoverable, however the loss of synchronization after loss of more than one mini-cells may take a significantly longer number of mini-cells to occur. Since the loss of a single cell is a relatively common occurrence, recovery from single mini-cell loss errors may constitute to significant advantage of the best mode described herein. The presence of the permanent change indicator ensures that even after a loss of a long burst of mini-cells, the receiving switch will always know whether the same number of users are in the trunk group or not, and recovery of de-multiplexing to the correct end users will be possible after a prolonged mini-cell loss. Since changes in the number of users of the trunk group are made dynamically in order to accommodate a smaller or larger number of low bit rate users on the connection, via the ANP, at all stages the receiving switch has full knowledge of the current and new trunk group size.

Signaling of the changes in the number of user data souces is as follows. The ANP is used for the negotiation of a connection identifier (CID) for a newly established multiple channel adaptation connection. Thereafter, use of a CHANGE procedure is a minimal extension to the ANP procedure required in order to negotiate a change in the number of users being supported (ie the number of time slots being carried by) an SSCS-MCA connection. This procedure operates as follows:

the requesting node transmits a CHANGE REQUEST message containing a correlation reference, the CID value for the AAL-type 2 connection, CPS service options and UUI field conveying the details of the time slot(s) to be added or removed from the trunk group, included location(s) within the structure, ie the offset value(s)

if the responding node is unable to accept the requested change or changes, it replies with a CHANGE DENIED message with a same correlation reference and CID value as the original message plus a Cause field carrying the reason for denying the requested changes. The multiple channel adaptation connection then continues with its structure unchanged.

Alternatively, if the responding node is able to accept the requested changes, it replies with a CHANGE CONFIRM message containing the original correlation reference and UUI field.

Following ANP negotiations and agreement on a new trunk group structure, the requesting node device may implement the change. It must provide an in-band Change Indication Mechanism to accompany the change agreed via ANP so that the receiver can detect the change boundary. In this way, the end to end phase relationship between transmit and receive stations is maintained at all times. The in-band change mechanism may be robust in the possible presence of bit error or cell loss conditions, and thus meets at least the following minimum requirements:

1) An ability to determine a phase/start of structure size change.

2) An ability to always determine current structure size even in the event of burst error conditions, ie it is always possible to attain full re-synchronization even when a change is pending.

3) No error extension in the event that the change occurs in the presence of a single cell loss/error condition.

Requirement 2) above dictates that the basic mechanism should provide a permanent indication that the change has occurred. Any structure change relying solely on a transitory indicator could be missed completely under cell loss conditions, making the resultant re-synchronization process complex and potentially ambiguous.

Requirement 3) above is more demanding. In the event of a packet loss a permanent change indicator will generally indicate that a change is about to occur or has already occurred. It may not be sufficient to predict the exact phase boundary of the change. If this is misinterpolated, in the worst case a permanent phase change will occur. To meet this requirements the in-band structure size change indication is implemented via codes with the PPT as described herein, which provide both a permanent and a transitory indication of the change.

The 00 and 01 values of the PPT are used to provide the permanent change indication—the value of the PPT is flipped between these values between successive changes of the trunk group structure size. The transitory element is provided using the 10 value of PPT field, giving further correlation of the structure size change. The PPT value is "pulsed" once to indicate the position of the change in the trunk group frame. For example if the original value of the PPT is 00, then all user mini-cells will contain this value up to the mini-cell containing the start of the structure size change. This mini-cell alone will contain a PPT value of 10, thereafter (until the next change in trunk group size is made) the mini-cells will contain a PPT set to 01. The mechanism may provide a secure change indication method even in the event of cell loss.

As can be seen from the foregoing, a difference between the single channel adaptation mechanism and the multiple channel adaptation mechanism as described herein lies in the functionality of the SSCS. For AAL-2 SCA, the SSCS uses information from a single source to generate each SSCS-packet data unit whereas for AAL-type 2 multiple channel adaptation, the SSCS users information from multiple sources to generate an SSCS-packet data unit. The single channel adaptation and multiple channel adaptation packets may be transported together on the same ATM connection. The AAL-2 multiple channel adaptation mechanism resides within the SSCS sub-layer and may be implemented at no cost to other applications. In addition, it places minimal extra requirements on the AAL-2 negotiation procedures (ANP).

The low bit rate synchronous services supported by SCA and MCA comprise any low bit rate (64 kbit/s/s or lower) service which generates user information on a fixed periodic basis. For example, for 64 kbit/s/s PCM 32 kbit/s/s ADPCM, and 16 kbit/s/s ADPCM, an octet of information is generated every 125 $\mu$S, 250 $\mu$S, and 500 $\mu$S respectively. For LD-CELP 10 bits of information are generated every 625 $\mu$S. Table 2 below shows that for these services, by multiplexing on a trunk group basis using SSCS-MCA a considerable increase in bandwidth utilization efficiency for a given bounded cell assembly delay can be attained compared with SSCS-SCA. The results in table 2 assume a 1 $\mu$S SSCS-PDU assembly delay.

TABLE 2

| Coding Algorithm | Efficiency | |
|---|---|---|
| | SSCS-MCA | SSCS-SCA |
| 64 kbits/s PCM | 86–92% | 71% |
| 32 kbits/s ADPCM | 86–92% | 56% |

TABLE 2-continued

| Coding Algorithm | Efficiency | |
|---|---|---|
| | SSCS-MCA | SSCS-SCA |
| 16 kbits/s ADPCM | 86–92% | 39% |
| LD-CELP | 91% | 25% |

There are a number of potential applications than can be readily identified that will benefit from the use of MCA. These include PBX to PBX trunking, MSC to MSC trunking, variable PxPX sub-rate for multi-media to the desk top, and Legacy inter-working to the public switch telephone network (PSTN). The ability to multiplex on a trunk group basis as provided by SSCS-MCA together with the ability to multiplex on the user by user basis using SSCS-SCA may significantly enhance the applicability and flexibility of the AAL-type 2 layer.

SSCS-MCA methods described herein may enable information from multiple low bit rate sources to be multiplexed together on a trunk group basis to achieve a high bandwidth efficiency for a given bounded cell assembly delay. Irrespective of trunk group size, the SSCS-MCA mechanism can be tuned to generate SDU's of length approximately equal to the ATM payload size. This may yield an optimum balance between high bandwidth efficiency and the elimination of potential error extension. At all times the receiving station may have implicit knowledge of the length of the packets which it receives. However, it is possible to change the size of the trunk group dynamically during the lifetime of a connection to accommodate changes in the community of low bit rate users. The structure size change is performed in a controlled manner through a combination of the ANP negotiation procedure and in-band synchronization, and so again the receiving entity has full knowledge of the new structure before the change is made.

The SSCS-MCA mechanism may be used to achieve optimum bandwidth utilization whilst minimizing error extension effects and enabling MCA users to be freely multiplexed with SCA users. This can be achieve by tuning the MCA mechanism such that it produces SDU's of near optimum length irrespective of trunk group size. The optimum packet length is equal to the free packet payload size of the CPS-PDU thus minimizing CPS-packet header overhead whilst still guaranteeing one CPS packet header per cell to avoid error extension effects. This can be achieved in two ways:

For large trunk groups (of length greater than the CPS packet payload size) SSCS-MCA can segment trunk group frame the structure across multiple SDU's; and for small trunk groups it is possible to concatenate several frames of data into one SDU.

Using SSCS-MCA recovery (without loss of synchronization) may be attainable after the loss of a single mini-cell or other error condition. There is no requirement for error detection or correction over the payload information in the SSCA-MCA SDU. It is possible to determine when there is an error in the SSCS packet header. The error control field acting over the CPS packet header is sufficient to further minimize any risk of possible misconnection due to error in the UUI field.

Figure 17:
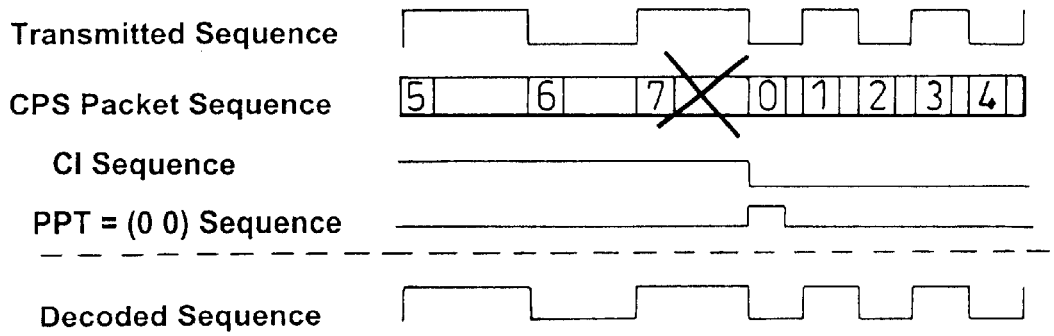
FIG. 17 illustrates schematically a decoding sub-process according to a specific method of the present invention.

Referring to FIG. 17 herein, there is shown an example of how a trunk group frame size change can be interpolated during the loss of a single mini-cell, whilst still maintaining synchronization. In FIG. 17, there is shown a case where a CPS packet mini-cell sequence incurs loss of a CPS packet before a change of trunk group size. The packet sequence is incremented using the sequence indicator 5, 6, 7, 0, 1, 2, 3, 4. The PPT field values during the sequence of 8 transmitted packets is 01, 01, 01, 10, 00, 00, 00, 00. The third packet is lost (packet sequenced 0), but because the packet, sequenced 1, has a PPT field set to 10 the receiver infers that the lost packet, sequenced 0, did not contain a structure size change, but the received packet sequenced 1 does contain a structure size change.

Figure 18:
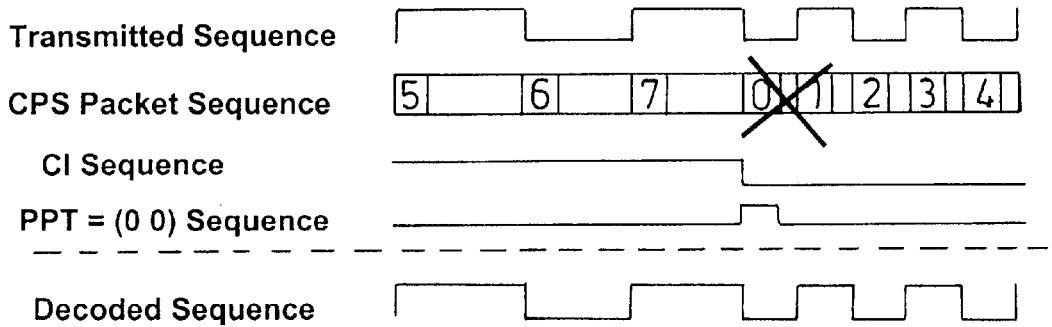
FIG. 18 illustrates schematically another decoding sub-process according to a specific method of the present invention.

Referring to FIG. 18 herein, a sequence of eight mini-cells (CPS packets) is transmitted. In this case, a packet containing the change pulse (CP) is lost. The packets are sequenced using the sequence indicator and sequence number in a sequence 5, 6, 7, 0, 1, 2, 3, 4 and the fourth CPS packet, sequenced 0, is lost during transmission. Since the next packet, packet 1 has an inverted permanent change indicator compared to the last received packet 7, received before the lost packet, the receiver can infer that a change must have occurred during the lost packet.

Figure 19:
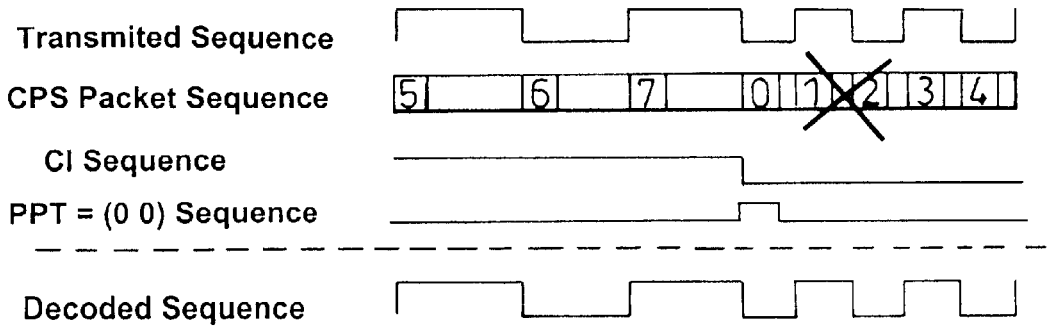
FIG. 19 illustrates schematically another decoding sub-process according to a specific method of the present invention.

Referring to FIG. 19 herein, there is shown an error recovery procedure in a case where a CPS packet mini-cell is lost after a change of number of users in the trunk group. Mini-cells are sequenced 5, 6, 7, 0, 1, 2, 3, 4 and CPS packet mini-cell 1 is lost during transmission. Since mini-cell 1 is received, the trunk group user number size change is implemented by the receiving switch. Mini-cell 2 is lost, but mini-cell 3 has an inverted permanent change indicator (PCI value of 00 compared to the previous permanent change indicator) PCA value 01 before the change in trunk group size. The receiver can therefore infer that there have been no changes in trunk group size contained in lost packet 2.

Figure 20:
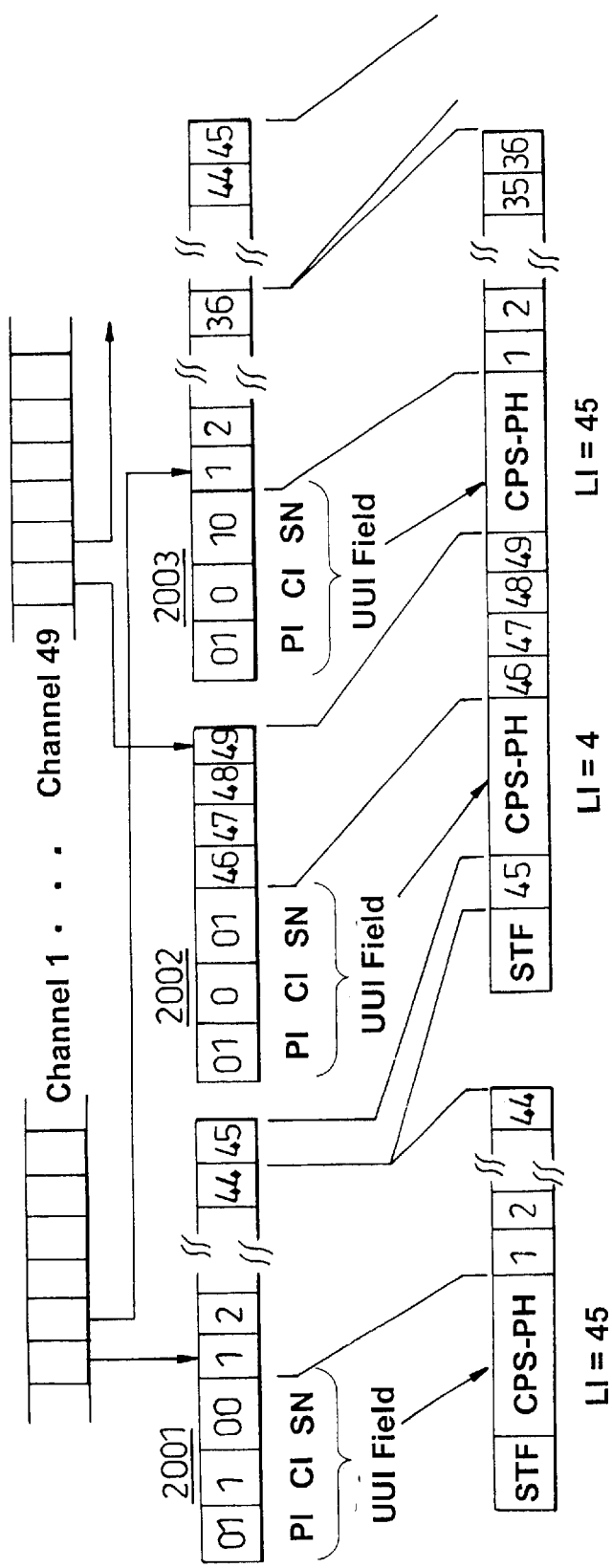
FIG. 20 illustrates schematically a method of multiplexing long data structures into a plurality of mini-cells.

Referring to FIG. 20 herein, there is illustrated an example of segmentation of a large trunk group containing a large plurality of user data from a large plurality of user data sources into several successive mini-cells. There is no restraint on the maximum size of trunk group which can be multiplexed into a number of cells in the present best mode, since the 1 bit continuation indication field (CI) can be used to assemble large trunk groups into plurality of mini-cells as hereinbefore described with reference to FIG. 11.

FIG. 20 illustrates multiplexing of data from 49 user data sources into a plurality of mini-cell packets. A user trunk group containing 49 octets of user data from 49 different user data sources is multiplexed into a plurality of mini-cells. The first mini-cell contains the continuation indicator (CI) value 1, indicating that the data payload of the mini-cell is continued into the next mini-cell 2002. The first mini-cell 2001 includes a PPT field value 01 (this value could have also been value 00, depending upon the previous inversion 00 or 01 in previous mini-cells). The first 45 octets of data are included as the data payload of first mini-cell 2001. The CPS packet header of the first mini-cell 2001 includes a length indicator of 45 (LI=45). The trunk group data is continued into second mini-cell 2002. The continuation indicator in the second mini-cell 2002 is set at 0, indicating that the data payload of the second mini-cell is not continued into a third mini-cell. The second mini-cell includes channels 46 to 49 of the user data, ie a relatively short data payload. The length indicator in the corresponding CPS packet header is set to 4, indicating a payload size of 4 octets. The next trunk group frame of 49 users is multiplexed in a similar way in third mini-cell 2003 and subsequent mini-cells.

Figure 21:
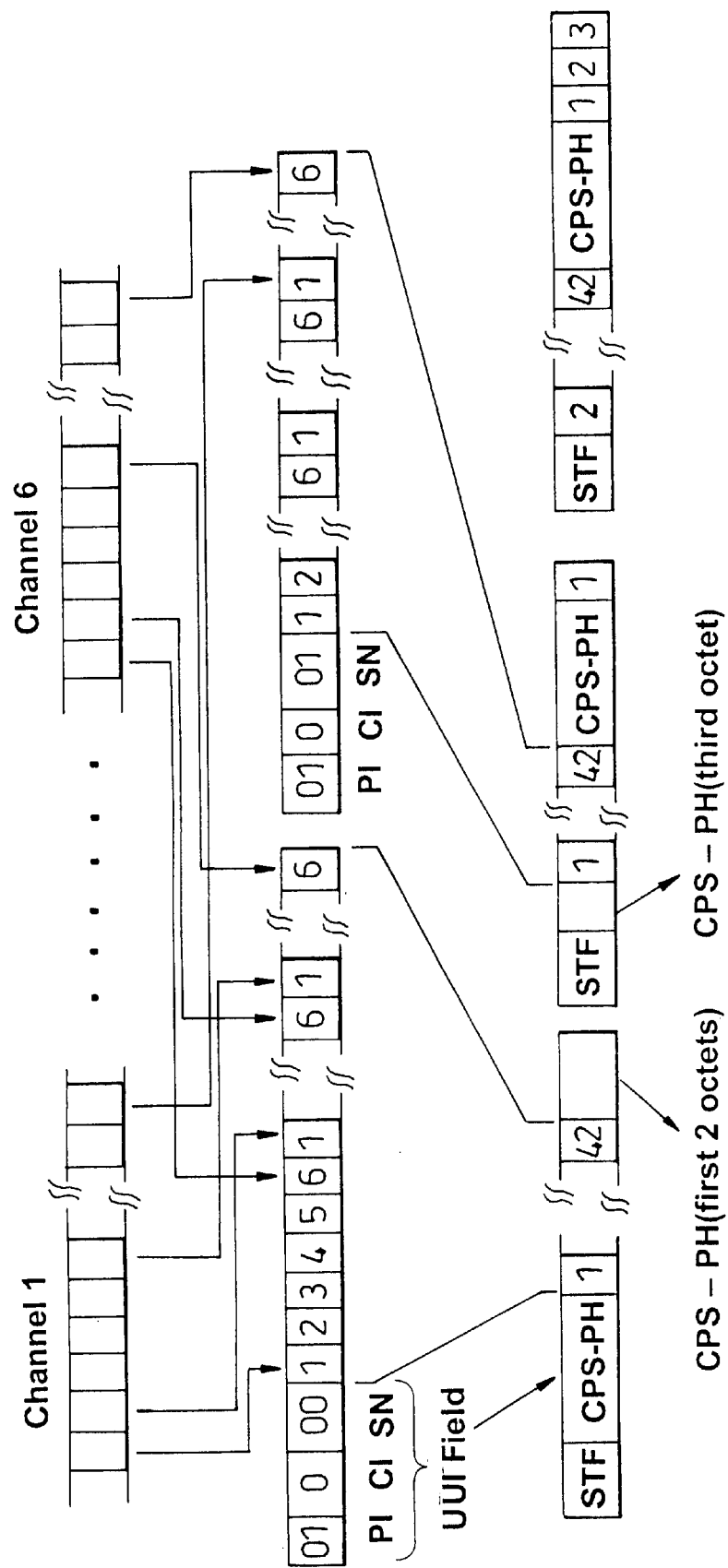
FIG. 21 illustrates a method of multiplexing relatively short data structures into a plurality of mini-cells.

Referring to FIG. 21 herein, there is shown an example of multiplexing of a relatively small trunk group having a relatively small number of user data sources. Several successive trunk group frames can be concatenated into a single CPS packet payload. Since packet assembly delay is increased when successive trunk group frames are multiplexed together, a minimum packet assembly delay is therefore controlled by specifying a minimum trunk group size. For example a minimum trunk group size of 6 users implies that it will take almost 7 successive frames to generate an SSCS-service data unit whose length will fit into a maximum length CPS packet payload. At a 64 kbit/s user bit rate, this implies a maximum packet assembly delay of less that 1 ms, which is satisfactory for many applications. The maximum packet assembly delay can be increased or decreased by defining a minimum trunk group size accordingly. There is no net penalty in delay with this approach. Concatenation of structures into an SSCS protocol data unit first is equivalent to multiplexing packets by the CPS into an ATM cell.

The number of frames that can be bound into a single SSCS data unit is dependent upon the current trunk group structure size. It may be calculated as the integer division of the maximum CPS packet payload size (45 octets) by the trunk group size. The CPS packet header overhead is thus minimized whilst the resulting protocol data unit does not exceed the maximum packet length limit. For example with a 6 channel trunk group this implies that 7 successive frames can be concatenated together. The efficiency of the SSCS-MCA connection therefore varies with a structure size, but in all cases the utilization is significantly higher than that attained for a similar SSCS single channel adaptation connection. Further, although the size of the packet varies with the group structure size, its size is completely deterministic and the receiver always has implicit knowledge of its length.

| Abbreviations | |
|---|---|
| AAL | ATM adaptation layer |
| AAL-type 1 | ATM adaptation layer type 1 |
| AAL-type 2 | ATM adaptation layer type 2 |
| ANP | ATM negotiation procedure |
| ATM | asynchronous transfer mode |
| CI | continuation indication field (1 bit) |
| CP | change pulse |
| CPS | common part sub-layer |
| CRC | cyclic redundancy data |
| LI | length indication |
| MCA | multiple channel adaptation |
| OAM | operation and maintenance |
| PCI | permanent change indicator |
| PDU | protocol data unit |
| PPT | packet payload type |
| SCA | single channel adaptation |
| SDU | service data unit |
| SI | sequence indication field (2 bits) |
| SN | sequence number (1 bit) in start field |
| SSCS | service specific convergence sub-layer |
| UID | user identification |
| UUI | CPS user to user indication |

REFERENCES

[1] Copies of the ATM standards protocols are available from International Telecommunications Union (ITU), Sales and Marketing Service, Place des Nations, CH-1211, Geneva 20, Switzerland, telephone +41 22 730-66666 or from the ATM Forum, 2570 West El Camino Real, Suite 304, Mountain View, Calif. CA90404, USA.

[2] Draft ITU-T Recommendation I.363.2 "B-ISDN ATM Adaptation Layer Type-2 Specification" (Madrid 1996), Recommendation I.363.2 (November 1996), available from International Telecommunications Union.

What is claimed is:

1. A method of communicating user data of a plurality of user data sources over a communications network, said method comprising the steps of:

multiplexing a data sample from each of a plurality of user data sources to produce a frame of user data, said frame containing data of each of said plurality of user data sources; and assembling said frame into a data payload of at least one asynchronous transfer mode mini-cell;

including a protocol header signal in a said mini-cell, to indicate a change in number of user data sources whose data is assembled into a said at least one mini-cell; and using a packet payload type field of a service specific convergence sub-layer header of an asynchronous transfer mode mini-cell to indicate change of number of said user data sources whose data is carried in a series of said mini-cells.

2. A method as claimed in claim 1, wherein said frame is of a length greater than the payload length of a said mini-cell.

3. A method as claimed in claim 2, wherein a said frame is partitioned to run consecutively across a plurality of said mini-cell payloads.

4. A method as claimed in claim 3, comprising the step of:

assembling a respective protocol header to each of said mini-cells, said protocol header comprising a continuation indicator signal indicating whether or not said frame continues beyond a length of said mini-cell.

5. A method as claimed in claim 4, wherein said continuation indicator signal comprises a single bit field.

6. A method as claimed in claim 5, wherein a said mini-cell comprises an asynchronous transfer mode adaptation layer-type 2 common part sub-layer packet.

7. A method as claimed in claim 6, wherein said continuation indicator signal comprises an asynchronous transfer mode adaptation layer-type 2 header.

8. A method as claimed in claim 7, wherein said continuation indicator signal comprises an asynchronous transfer mode adaptation layer-type 2 service specific convergence sub-layer field.

* * * * *